United States Patent
Iwamoto

(10) Patent No.: US 12,307,811 B2
(45) Date of Patent: May 20, 2025

(54) IMAGE PROCESSING DEVICE AND CONTROL METHOD THEREOF, IMAGING APPARATUS, AND RECORDING MEDIUM

(71) Applicant: CANON KABUSHIKI KAISHA, Tokyo (JP)

(72) Inventor: Yasuhiko Iwamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 17/670,437

(22) Filed: Feb. 12, 2022

(65) Prior Publication Data
US 2022/0277585 A1    Sep. 1, 2022

(30) Foreign Application Priority Data

Feb. 26, 2021    (JP) .................. 2021-030678

(51) Int. Cl.
| | |
|---|---|
| *G06V 40/16* | (2022.01) |
| *G06T 7/215* | (2017.01) |
| *G06T 7/73* | (2017.01) |
| *G06V 20/52* | (2022.01) |

(52) U.S. Cl.
CPC .......... *G06V 40/166* (2022.01); *G06T 7/215* (2017.01); *G06T 7/73* (2017.01); *G06V 20/52* (2022.01); *G06V 40/172* (2022.01)

(58) Field of Classification Search
CPC .... G06V 40/166; G06V 20/52; G06V 40/172; G06T 7/125; G06T 7/73
See application file for complete search history.

(56) References Cited

U.S. PATENT DOCUMENTS

| | | | |
|---|---|---|---|
| 9,311,712 B2 | 4/2016 | Fukata | ................ G06T 7/0044 |
| 10,326,927 B2 | 6/2019 | Sasaki | ............. H04N 5/232122 |
| 11,048,919 B1 * | 6/2021 | Modolo | ................ G06V 20/40 |
| 2014/0247374 A1 * | 9/2014 | Murakami | ........... H04N 23/635 |
| | | | 348/222.1 |

FOREIGN PATENT DOCUMENTS

| | | |
|---|---|---|
| JP | 2012-015889 | 1/2012 |
| JP | 2019-041414 | 3/2019 |

OTHER PUBLICATIONS

U.S. Appl. No. 17/670,438, filed Feb. 12, 2022.
S. Haykin, "Neural Networks: A Comprehensive Foundation—2nd Edition", Prentice Hall, Jul. 1998.
Alejandro Newell, Zhiao Huang, Jia Deng, "Associative Embedding: End-to-End Learning for Joint Detection and Grouping", Neural Information Processing Systems, 2017.

\* cited by examiner

*Primary Examiner* — David Perlman
(74) *Attorney, Agent, or Firm* — Venable LLP

(57) ABSTRACT

An imaging apparatus acquires consecutive images in time order and performs image processing on the images. The imaging apparatus detects a first portion (a face or the like) of a subject in the images and detects a second portion (a torso or the like) of a subject in the images. The imaging apparatus uses a detection result obtained from a previously acquired image to perform processes of searching for a detection result obtained from a current image and classifying a detection result satisfying a condition for each of subjects. In the search process, a same portion search using detection results of the same portion from the previously acquired image and the current image is preferentially performed over a different portion search using detection results of different portions from the previously acquired image and the current image.

31 Claims, 18 Drawing Sheets

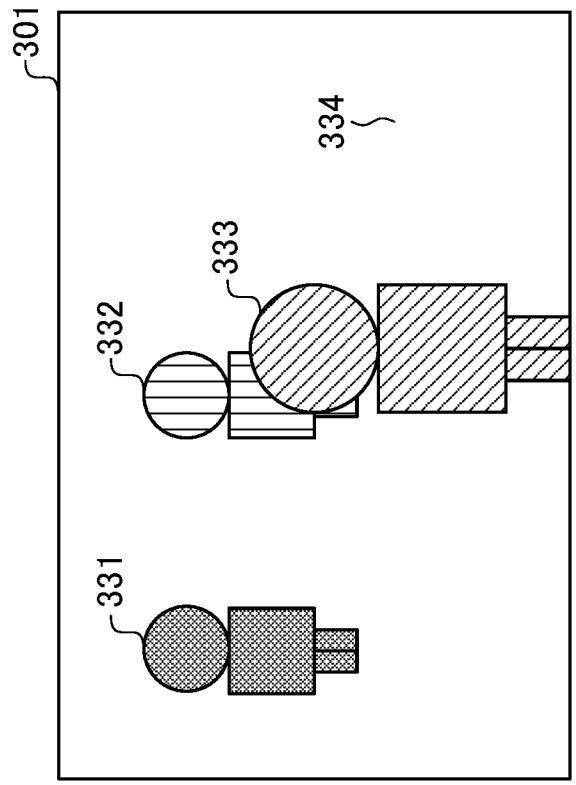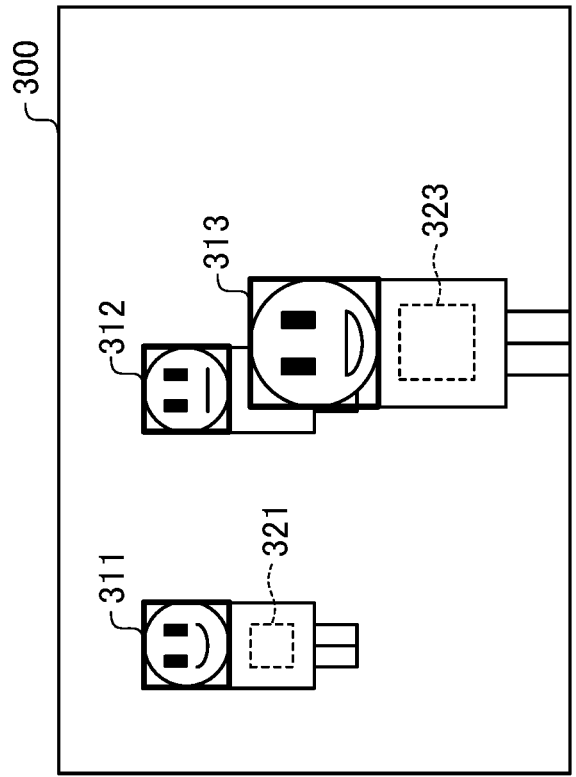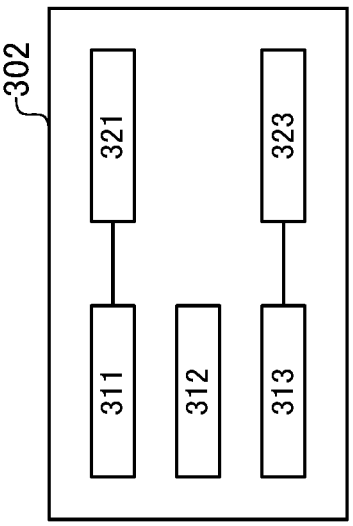

FIG. 12A
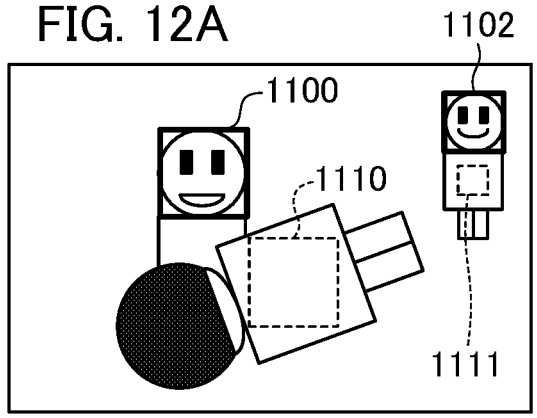
FIG. 12B
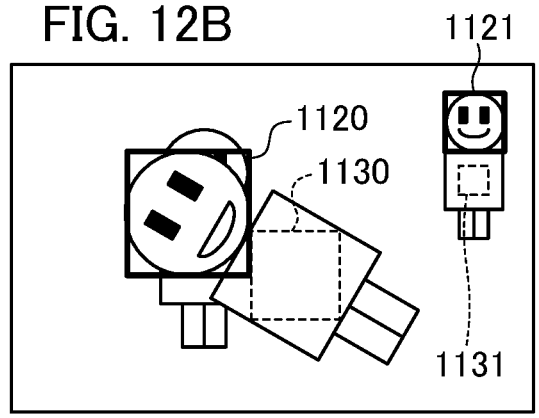
FIG. 12C
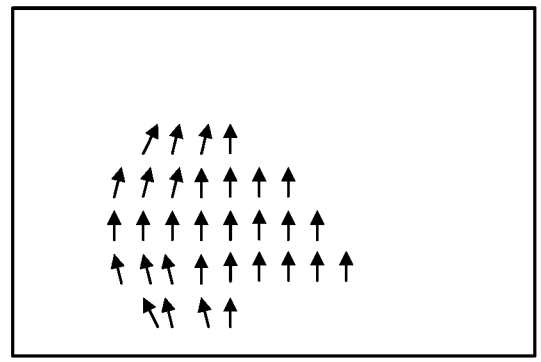
FIG. 12D
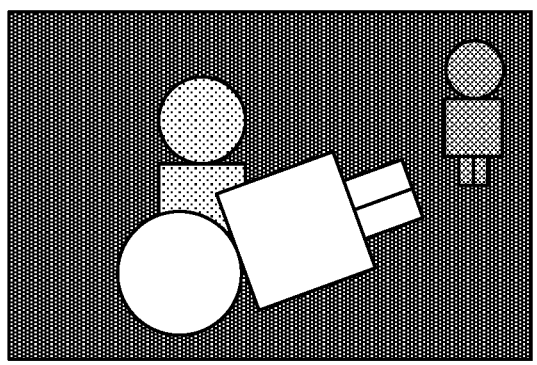
FIG. 12E
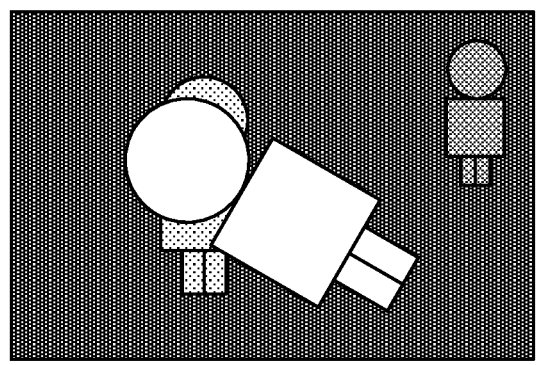
FIG. 12F
| DETECTION 1 PROHIBITED REGION | DETECTION 2 PROHIBITED REGION |
|---|---|
| 1100 | |
| 1102 | 1111 |
FIG. 12G
| SUBJECT ID | DETECTION 1 REGION | DETECTION 2 REGION |
|---|---|---|
| C | 1120 | 1130 |
| A | 1121 | 1131 |

IMAGE PROCESSING DEVICE AND CONTROL METHOD THEREOF, IMAGING APPARATUS, AND RECORDING MEDIUM

BACKGROUND OF THE INVENTION

Field of the Invention

The present invention relates to an imaging apparatus, and particularly to detection of a portion of a subject.

Description of the Related Art

In a process of detecting a subject using an imaging apparatus, a region corresponding to a portion such as a face is detected in each of images consecutively acquired in time order. A search process for obtaining a detection result in a current image by setting a predetermined range as a search range for a detection result in a previously acquired image is performed. Detection results satisfying search conditions are associated with each other as detection results of the same subject based on the fact that the same subject is present at nearby positions in consecutive images in a search process. Japanese Patent Laid-Open No. 2019-41414 discloses a technology for preventing erroneous detection by combining and determining detection results of multiple frames associated for the same subject.

Here, an image-capturing scene in which a subject is vigorously moving as in a gymnastics competition, etc., and occlusion frequently occurs at specific portions may be assumed. In such a case, by providing a new means to detect not only the face of the subject but also a different portion such as the torso of the subject, subject detection accuracy can be improved.

It is difficult in the related art to perform a search process satisfying a predetermined accuracy condition in an embodiment provided with a plurality of detection means. In a case in which multiple portions of a subject need to be classified, if a portion which should have been classified as a first subject is classified as a portion of a second subject by mistake, the subject detection accuracy is likely to decrease.

SUMMARY OF THE INVENTION

The present invention aims to provide an image processing device that enables detection results of multiple portions of subjects to be classified for each of the subjects with higher accuracy.

An image processing device according to an embodiment of the present invention includes an acquisition unit that acquires a captured image, a detection unit that detects multiple portions of a subject in the image, and a search unit that uses detection results obtained from a first previously acquired image to search for detection results obtained from a current second image and classify detection results satisfying conditions for each of subjects, in which, in a case in which the search unit is able to perform a different portion search using detection results of different portions from the first image and the second image and a same portion search using detection results of the same portion from the first image and the second image, the same portion search is preferentially performed over the different portion search.

Further features of the present invention will become apparent from the following description of exemplary embodiments with reference to the attached drawings.

BRIEF DESCRIPTION OF THE DRAWINGS

FIGS. 3A to 3D are schematic diagrams illustrating an overall processing example of the present embodiment.

FIGS. 12A to 12G are schematic diagrams of a prohibited region deletion example according to the present embodiment.

DESCRIPTION OF THE EMBODIMENTS

Embodiments of the present invention will be described below in detail with reference to the drawings. In the embodiments, an imaging apparatus to which an image processing device of the present invention is applied will be exemplified. Search results of a part of a subject in an image of the imaging apparatus are utilized in, for example, automatic focus adjustment control and subject tracking control, and the user is notified of the results through a display frame on the screen, or the like. For example, a case in which a torso region of a subject in a current image is searched for with reference to the face region of the subject in a previously acquired image is assumed. The face part and the torso part are originally flat in the images and the two parts are distant from each other, and thus the search range needs to be considered. If the search range is simply widened, a detection result of a part of the subject is likely to be associated with a detection result of another subject by mistake. A process to prevent detection results of parts of subjects from being mistakenly classified and to classify detection results for each subject with high accuracy will be described below.

Example 1

Figure 1:
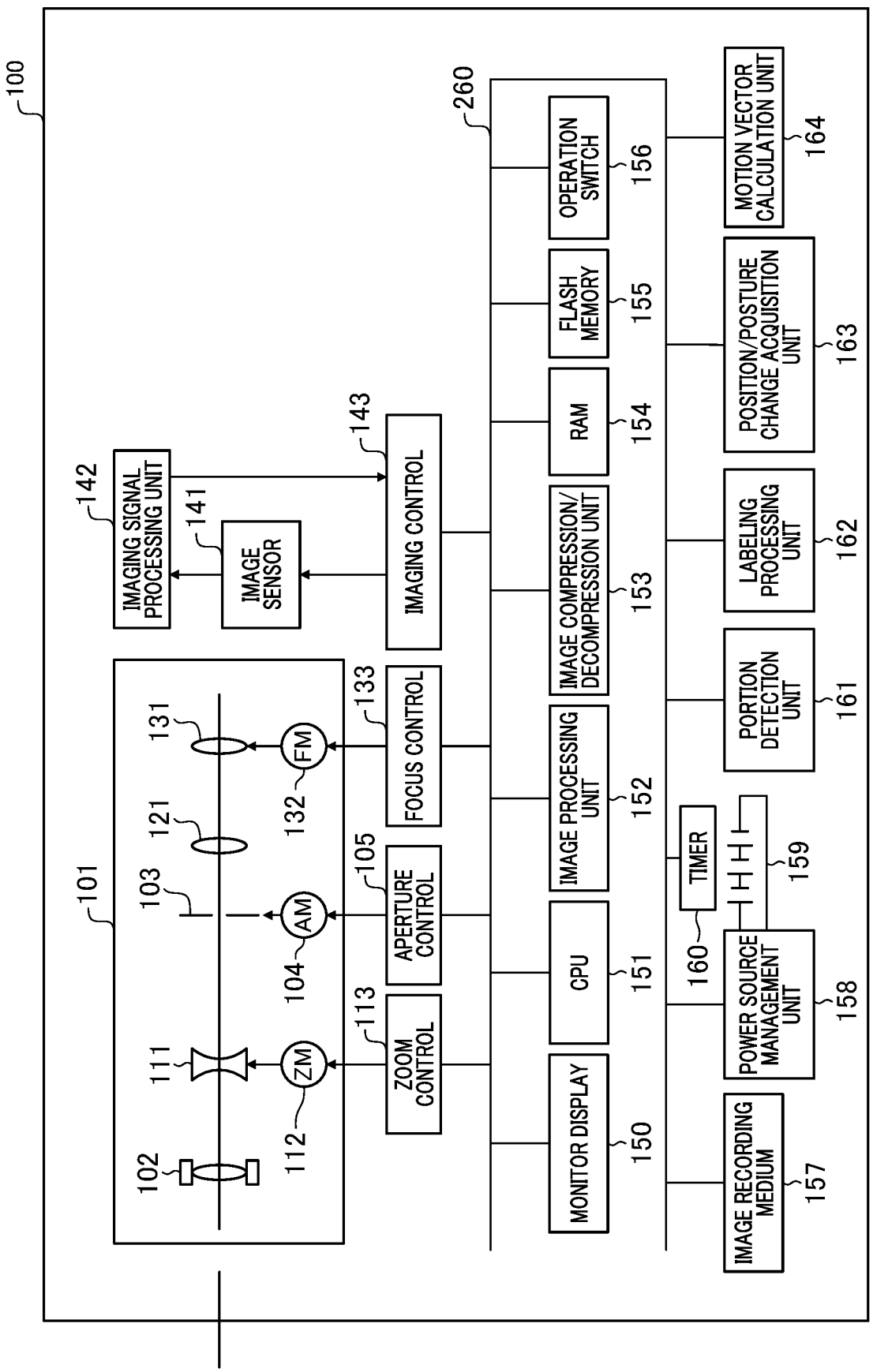
FIG. 1 is a block diagram illustrating a configuration of an imaging apparatus according to the present embodiment.

A configuration example of an imaging apparatus according to the present embodiment will be described with reference to FIG. 1. FIG. 1 is a block diagram illustrating a configuration of an imaging apparatus 100. The imaging apparatus 100 is a digital still camera, a video camera, or the like that can capture a subject and record it in a recording medium. Data of a moving image or a still image is recorded in a tape, a solid-state memory, an optical disc, a magnetic disk, or the like. Units included in the imaging apparatus 100 are connected to one another via a bus 260. Each of the units is controlled by a central processing unit (CPU) 151.

A lens unit 101 includes a fixed first group lens 102, a zoom lens 111, an aperture 103, a fixed third group lens 121, and a focus lens (focus adjustment lens) 131. An aperture control unit 105 follows commands of the CPU 151 to drive the aperture 103 using an aperture motor (AM) 104 and thus adjusts the opening diameter of the aperture 103 to adjust the light amount during capturing. A zoom control unit 113 drives the zoom lens 111 using a zoom motor (ZM) 112 to change a focal distance.

A focus control unit 133 determines a drive amount of a focus motor (FM) 132 based on a focus state detection result of the lens unit 101, that is, an amount of deviation of the lens unit in the focusing direction (a defocus amount). The focus control unit 133 drives the focus lens 131 using the focus motor 132 based on the determined drive amount to control the focus adjustment state. Auto-focus (AF) control is realized with the movement control of the focus control unit 133 and the focus motor 132 over the focus lens 131. Although the focus lens 131 is illustrated as a simple lens in a simplified manner in FIG. 1, it is generally constituted by multiple lenses.

A subject image (an optical image) formed on an image sensor 141 through the lens unit 101 is converted into an electrical signal by the image sensor 141. The image sensor 141 includes photoelectric conversion elements that perform photoelectric conversion on subject images. The image sensor 141 includes light-receiving elements of m pixels arrayed in the horizontal direction and n pixels arrayed in the vertical direction. For example, multiple microlenses and two photoelectric conversion elements corresponding to each of the microlenses are arrayed in the light-receiving region. An image signal photoelectrically converted by the image sensor 141 is arranged as predetermined image data by an imaging signal processing unit 142. Image data on the imaging plane can be acquired by adding the outputs of the two photoelectric conversion elements. In addition, two images having parallax (parallax images) can be acquired from the outputs of the two photoelectric conversion elements, respectively. It is assumed in the present embodiment that a signal of A image plus B image is acquired by adding the outputs of the two photoelectric conversion elements and an A image signal and a B image signal are acquired from the outputs of the two photoelectric conversion elements, respectively.

A monitor display 150 includes a display device and performs display of a captured image, display of an object detection result in a rectangular frame, and the like. Image data output by the imaging signal processing unit 142 is sent to an imaging control unit 143 and transiently accumulated in a random access memory (RAM) 154. Image data accumulated in the RAM 154 is compressed by an image compression/decompression unit 153 and then recorded in an image recording medium 157. In tandem with the operation, image data accumulated in the RAM 154 is sent to an image processing unit 152.

An operation switch unit 156 is an input interface unit including a touch panel, a button, and the like operated by a user. A user can perform a selection operation of various function icons displayed on the monitor display 150 to give a desired instruction to the imaging apparatus 100.

The CPU 151 processes a setting of the image sensor 141 based on a user operation instruction input from the operation switch unit 156 or a size of a pixel signal related to the image data transiently accumulated in the RAM 154. For example, the CPU 151 determines an accumulation time of the image sensor 141 and a set value of gain when the image sensor 141 gives an output to the imaging signal processing unit 142. The imaging control unit 143 receives instruction of the accumulation time and the set value of the gain from the CPU 151 to control the image sensor 141. For control over the imaging optical system, the CPU 151 performs AF control over a specific subject region using the focus control unit 133. In addition, the CPU 151 controls exposure using a luminance value of a specific subject region by means of the aperture control unit 105.

The image processing unit 152 acquires image data to process, for example, the image data to reduce or enlarge the data into an optimal size. The image data processed in the optimal size is sent to and appropriately displayed on the monitor display 150 to perform pre-view image display or through-image display. In addition, an object detection result of a portion detection unit 161 can be superimposed on an image on the monitor display 150 to be displayed. Furthermore, if the RAM 154 is used as a ring buffer, it is possible to buffer data of multiple images captured in a predetermined period and processing results of each unit corresponding to each piece of image data.

A defocus map or a confidence map can be generated based on A image and B image data acquired from the image sensor 141. A defocus map is a map which has information of a defocus amount for each pixel expressing each defocus amount in units of Fδ. A confidence map is a map having sets of coordinates each corresponding to those of a defocus map and information of confidence representing a degree of confidence in the defocus amount for each pixel. The defocus map is an example of information representing a depth distribution of an image in the depth direction, which enables information representing a distribution of distance information such as an image deviation amount map, a distance map, or a distance image acquired from multiple viewpoint images with different viewpoints to be used. Further, the method disclosed in U.S. Pat. No. 10,326,927 (B2) (Japanese Patent Laid-Open No. 2016-156934) may be used for a method for generating a defocus map and a confidence map. The method of U.S. Pat. No. 10,326,927 (B2) will be adopted for a method for generating a defocus map and a confidence map, and detailed description thereof will be omitted.

A flash memory 155 stores a control program necessary for operations of the imaging apparatus 100, parameters to be used in operations of each unit, and the like. When a user operation activates the imaging apparatus 100, that is, a state transitions from a power-off state to a power-on state, the control program and parameters stored in the flash memory 155 are read into a part of the RAM 154. The CPU 151 controls operations of the imaging apparatus 100 according to the control program and a constant loaded into the RAM 154. Image data, data related to images, and the like have been recorded in the image recording medium 157.

A battery 159 is appropriately managed by a power source management unit 158 to stably supply power to the entire imaging apparatus 100. A timer 160 is a timekeeping device that can acquire a relative time in units of milliseconds in synchronization with processing of each unit.

The portion detection unit 161 detects multiple regions corresponding to a predetermined portion of a subject using image signals. The detection process of the portion detection unit 161 can be implemented through a feature extraction process using, for example, a convolutional neural network (which will be referred to as a CNN below). More specifically, the method described in "Neural Networks: A Comprehensive Foundation 2nd Edition" (S. Haykin, Prentice Hall, pp. 156-255, July 1998) can be used. In addition, types of various subjects and portions of subjects can be detected by switching a weight of a feature detection cell surface in a CNN. Further, any method can be used in a portion detection process to implement the present invention.

A labeling processing unit 162 generates a label map separated for each subject in one image corresponding to the image. More specifically, the method described in "Associative Embedding: End-to-End Learning for Joint Detection and Grouping" (Alejandro Newell, Zhiao Huang, Jia Deng, Neural Information Processing Systems, 2017) can be used. If the portion detection unit 161 obtains detection results of multiple portions, the detection results of the multiple portions can be associated by comparing them with a label map.

A position/posture change acquisition unit 163 has a position/posture sensor such as a gyro sensor, an acceleration sensor, or an electronic compass to measure a position/posture change in a captured scene of the imaging apparatus 100. Data of the acquired position/posture change is stored in the RAM 154.

A motion vector calculation unit 164 performs a process of calculating a motion vector from image signals corresponding to two images consecutively acquired in time order. In the process of calculating a motion vector, a process of matching feature points in a past frame and a current frame is performed at multiple positions in the images to detect multiple motion vectors.

The flow of an overall process according to the present example will be described with reference to FIG. 2. It is assumed in the present example that the portion detection unit 161 can detect a face region and a torso region of a person that is a subject, and detection 1 is detection of the face region and detection 2 is detection of the torso region. In addition, it is assumed that the face region and the torso region of the person have equal importance. The process indicated in each step is implemented by the CPU 151 performing a program.

In S200, image data acquired by the imaging control unit 143 is supplied to each unit. In addition, time information of the time at which the image data was supplied, the time information being acquired at the same time, is acquired from a timer 160 and recorded in the RAM 154.

In S201, the portion detection unit 161 performs a detection process on the acquired image. Multiple detection regions related to the face region of the subject (hereinafter referred to as detection 1 regions) are acquired. In S202, the portion detection unit 161 performs a detection process on the acquired image. Multiple detection regions related to the torso region of the subject (hereinafter referred to as a detection 2 regions) are acquired.

In S203, the labeling processing unit 162 performs a labeling process on the acquired image. A labeling map in which regions of the subject are given different labels is acquired. In S204, the position/posture change acquisition unit 163 acquires data of a position/posture change of the imaging apparatus 100 in synchronization with the acquired image.

In S205, the motion vector calculation unit 164 acquires a motion vector map for the acquired image. In S206, the image processing unit 152 acquires a defocus map and a confidence map. In S207, the CPU 151 uses the label map acquired in S203 to perform a process of associating the multiple detection 1 regions acquired in S201 with the multiple detection 2 regions acquired in S202. The association process will be described later.

In S208, the CPU 151 determines whether there is a subject classification result of previously acquired images. If it is determined that there is a subject classification result, the process proceeds to S209, and if it is determined that there is no subject classification result, the process proceeds to S210.

In S209, the CPU 151 performs a search process on each of the detection regions acquired in S201 and S202 with reference to the subject classification result of the previously acquired image. As a result of the search, the subject classification result recorded in the RAM 154 is updated. The search process will be described below. The process proceeds to S210 after S209.

In S210, the CPU 151 performs a process of adding a new subject. Among the detection regions acquired in S201 and S202, a region not being in a used state in the search process of S209 is added to the subject classification result recorded in the RAM 154 as a new subject region. The addition of a new subject will be described later.

In S211, the CPU 151 calculates a subject priority for each subject of the subject classification result recorded in the RAM 154. A subject priority is determined based on the size of the detection 1 regions or the detection 2 regions. The larger the size, the higher the subject priority.

In S212, the CPU 151 determines whether the operation switch unit 156 has been operated to give an end instruction. If it is determined that there is a given end instruction, the entire process ends, and if it is determined that there is no given end instruction, the process returns to S200 to repeat the series of processes.

An operation example of the overall process will be described with reference to FIGS. 3A to 3D. An image acquired by the imaging apparatus 100 will be referred to as an acquired image below. FIG. 3A illustrates an example of detection regions of an acquired image 300 acquired in S201 and S202 of FIG. 2. Face regions 311, 312, and 313 of three persons are acquired in the process of S201 of FIG. 2. Torso regions 321 and 323 of two persons are acquired in the process of S202 of FIG. 2.

Figure 2:
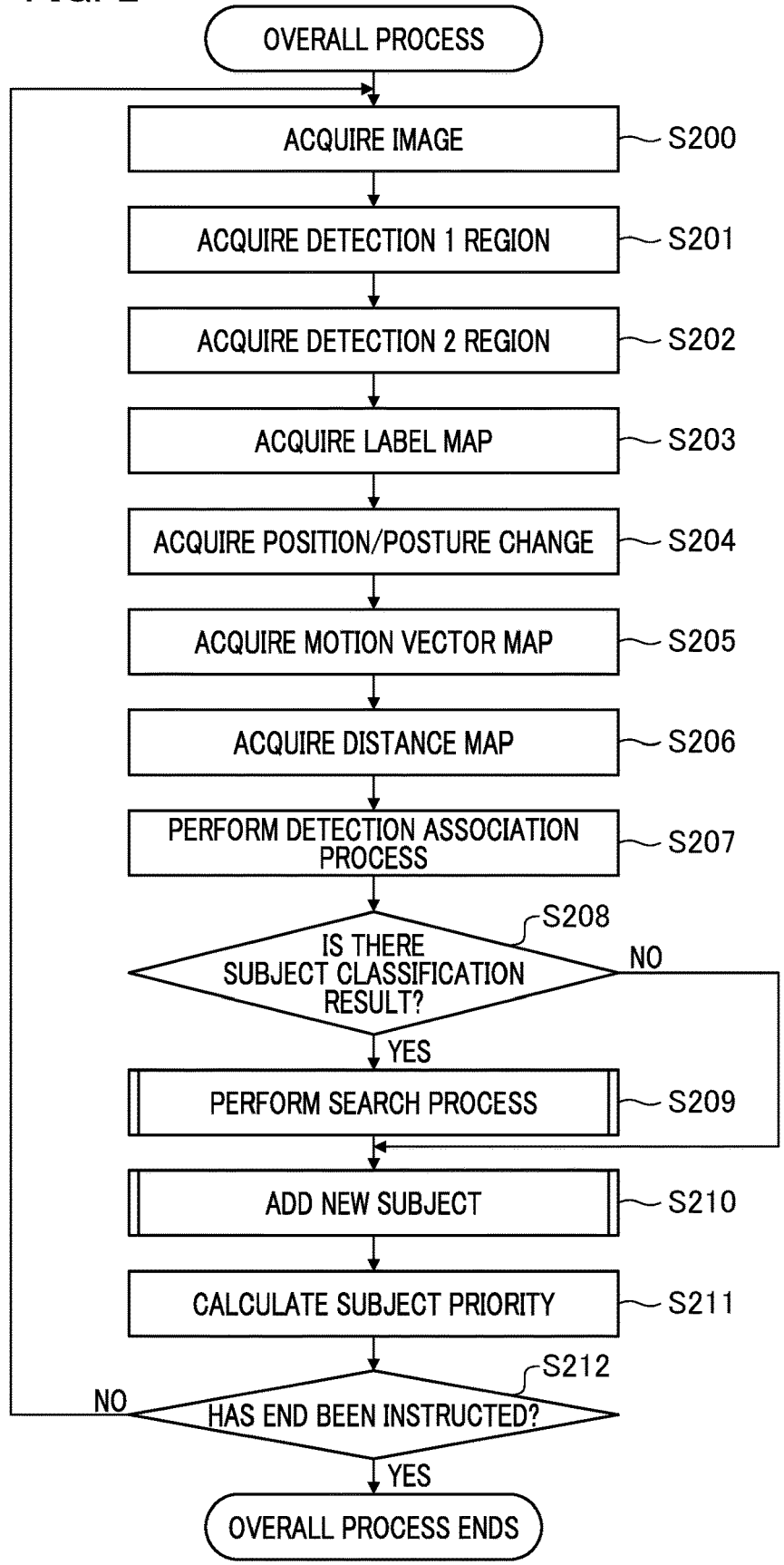
FIG. 2 is a flowchart of an overall process of the present embodiment.

FIG. 3B illustrates an example of a label map for the acquired image 300 acquired in S203 of FIG. 2. The label map 301 has coordinates corresponding to the acquired image 300 and contains labels 331, 332, 333, and 334 that enable subject regions or a background region to be distinguished according to the coordinates. The labels 331, 332, and 333 are pieces of identification information corresponding to each of the subject regions of the three persons. The label 334 is identification information corresponding to the background region.

FIG. 3C illustrates an example of results of a detection/association process performed using the face regions, the torso regions, and the label map. In the detection/association process, a process of referring to the label map for each detection region in one image and searching for a detection region in the other image belonging to the same label is performed. For example, the face region 311 of the first person positioned on the left side is associated with the torso region 321 belonging to the same label 331. The face region 312 of the second person positioned at the center is not associated with a torso region because there is no torso region belonging to the same label 332. The face region 313 of the third person positioned in the front is associated with the torso region 323 belonging to the same label 333.

FIG. 3D illustrates an example of subject classification results recorded in S209 or S210 of FIG. 2. The subject classification results include information of subject IDs, the detection 1 regions, and the detection 2 regions with respect to each subject. Subject IDs A, B, and C are assigned to identify the first, second, and third persons, respectively.

Figure 4:
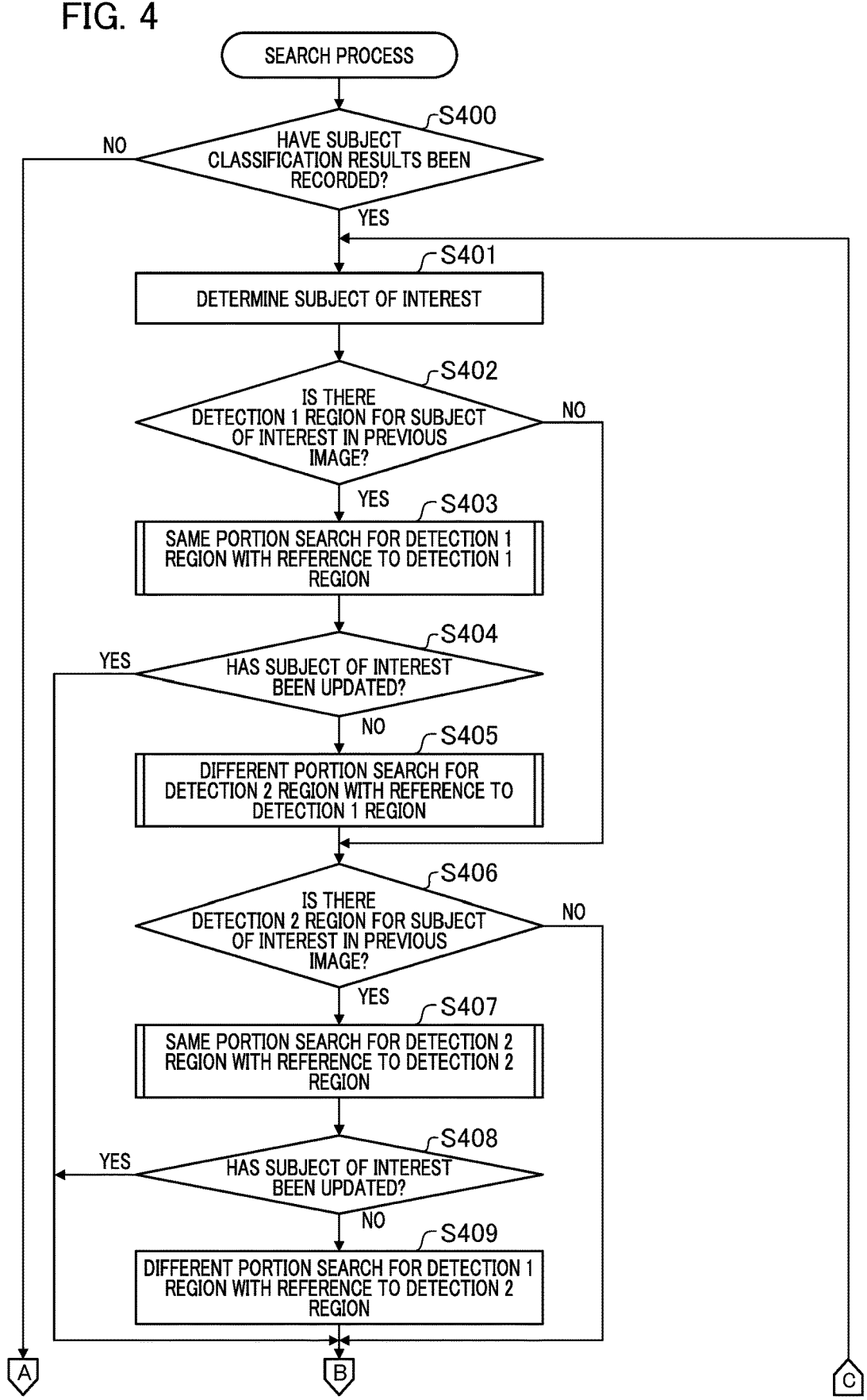
FIG. 4 is a flowchart of a search process according to Example 1.

The search process (S209 of FIG. 2) according to the present example will be described in detail with reference to FIGS. 4 and 5. In S400, the CPU 151 determines whether subject classification results have been recorded in the RAM 154 in the search process for a previously acquired image. If it is determined that subject classification results have been recorded in the RAM 154, the process proceeds to S401, and if it is determined that no subject classification results have been recorded in the RAM 154, the search process ends.

In S401, the CPU 151 determines a subject of interest from the subject classification results recorded in the RAM 154. If there are multiple candidates for a subject of interest, a subject with a high subject priority calculated in S211 of FIG. 2 is prioritized.

In S402, the CPU 151 determines whether detection 1 regions classified as regions of the subject of interest in the previously acquired image have been recorded in the RAM 154. If it is determined that the detection 1 regions have been recorded, the process proceeds to S403, and if it is determined that no detection 1 regions have been recorded, the process proceeds to S406.

A same portion search process is performed in S403. The CPU 151 searches multiple detection 1 regions obtained from a current image for the same portion with reference to the detection 1 regions classified as regions of the subject of interest in the previously acquired image. The same portion search process will be described later in detail.

In S404, the CPU 151 determines whether regions satisfying a condition have been found from the detection regions of the current image and subject classification results of the subject of interest have been updated. If it is determined that the subject classification results of the subject of interest have been updated, the process proceeds to S410 of FIG. 5, and if it is determined that the subject classification results have not been updated, the process proceeds to S405.

A different portion search process is performed in S405. The CPU 151 searches multiple detection 2 regions obtained from the current image for a different portion with reference to the detection 1 regions classified as regions of the subject of interest in the previously acquired image. The different portion search process will be described later in detail.

In S406, the CPU 151 determines whether the detection 2 regions classified as regions of the subject of interest in the previously acquired image have been recorded in the RAM 154. If it is determined that the detection 2 regions have been recorded, the process proceeds to S407, and if it is determined that no detection 2 regions have been recorded, the process proceeds to S410 of FIG. 5.

The same portion search process is performed in S407. The CPU 151 searches multiple detection 2 regions obtained from the current image for the same portion with reference to the detection 2 regions classified as regions of the subject of interest in the previously acquired image. The same portion search process will be described later in detail.

In S408, the CPU 151 determines whether regions satisfying a condition have been found from the detection regions of the current image and subject classification results of the subject of interest have been updated. If it is determined that the subject classification results of the subject of interest have been updated, the process proceeds to S410 of FIG. 5, and if it is determined that the subject classification results of the subject of interest have not been updated, the process proceeds to S409.

The different portion search process is performed in S409. The CPU 151 searches multiple detection 1 regions obtained from the current image for a different portion with reference to the detection 2 regions classified as regions of the subject of interest in the previously acquired image. The different portion search process will be described below in detail. The process proceeds to S410 of FIG. 5 after S409.

In S410, the CPU 151 determines whether the subject classification results of the subject of interest have been updated with the detection 1 regions and the detection 2 regions obtained from the current image. If it is determined that the subject classification results of the subject of interest have been updated, the process proceeds to S411, and if it is determined that the subject classification results of the subject of interest have not been updated, the process proceeds to S412.

In S411, the CPU 151 calculates portion vectors and records them in the RAM 154. The portion vectors are assumed to be expressed with two-dimensional vectors with respect to the image plane. The portion vectors can be obtained by calculating a differential value between coordinates of the detection 1 regions and the detection 1 regions recorded as the subject classification results of the subject of interest using subtraction. The time information recorded in the RAM 154 in S200 of FIG. 2 is recorded in the RAM 154 as a recording time of the portion vectors. The process proceeds to S414 after S411.

In S412, the CPU 151 determines whether a predetermined period of time has elapsed from the time recorded in S411 in the search process for the previously acquired image. A length of the predetermined period of time is a threshold time set according to the type of a subject to be detected. For example, if the type of a subject is a person, T1 is set, and if the type of a subject is an animal, T2 (<T1) is set. If it is determined that the predetermined period of time has elapsed, the process proceeds to S413, and if it is determined that the predetermined period of time has not elapsed, the process proceeds to S414.

In S413, the CPU 151 deletes data of the portion vectors recorded in the RAM 154. Then, in S414, the CPU 151 performs updating with detection 1 prohibited regions for the subject of interest using the detection 1 regions that have not been used for updating of the subject classification results. The updating process will be described below in detail. The process proceeds to S415 after S414.

In S415, the CPU 151 performs updating with detection 2 prohibited regions for the subject of interest using the detection 2 regions that have not been used for updating of the subject classification results. The updating process will be described below in detail. In S416, the CPU 151 determines whether there is a subject that is not selected as a subject of interest in S401 of FIG. 4 among the subject classification results recorded in the RAM 154 in the previously acquired image. If it is determined that there is a corresponding subject, the process returns to S401 to continue the process, and if it is determined that there is no corresponding subject, the search process ends.

In the present example, the same portion search process with higher accuracy is preferentially performed over the different portion search process with lower accuracy. If the subject classification results of the subject of interest are updated in the prioritized search process, the search process with higher accuracy can be performed without performing the other search process.

Figure 6:
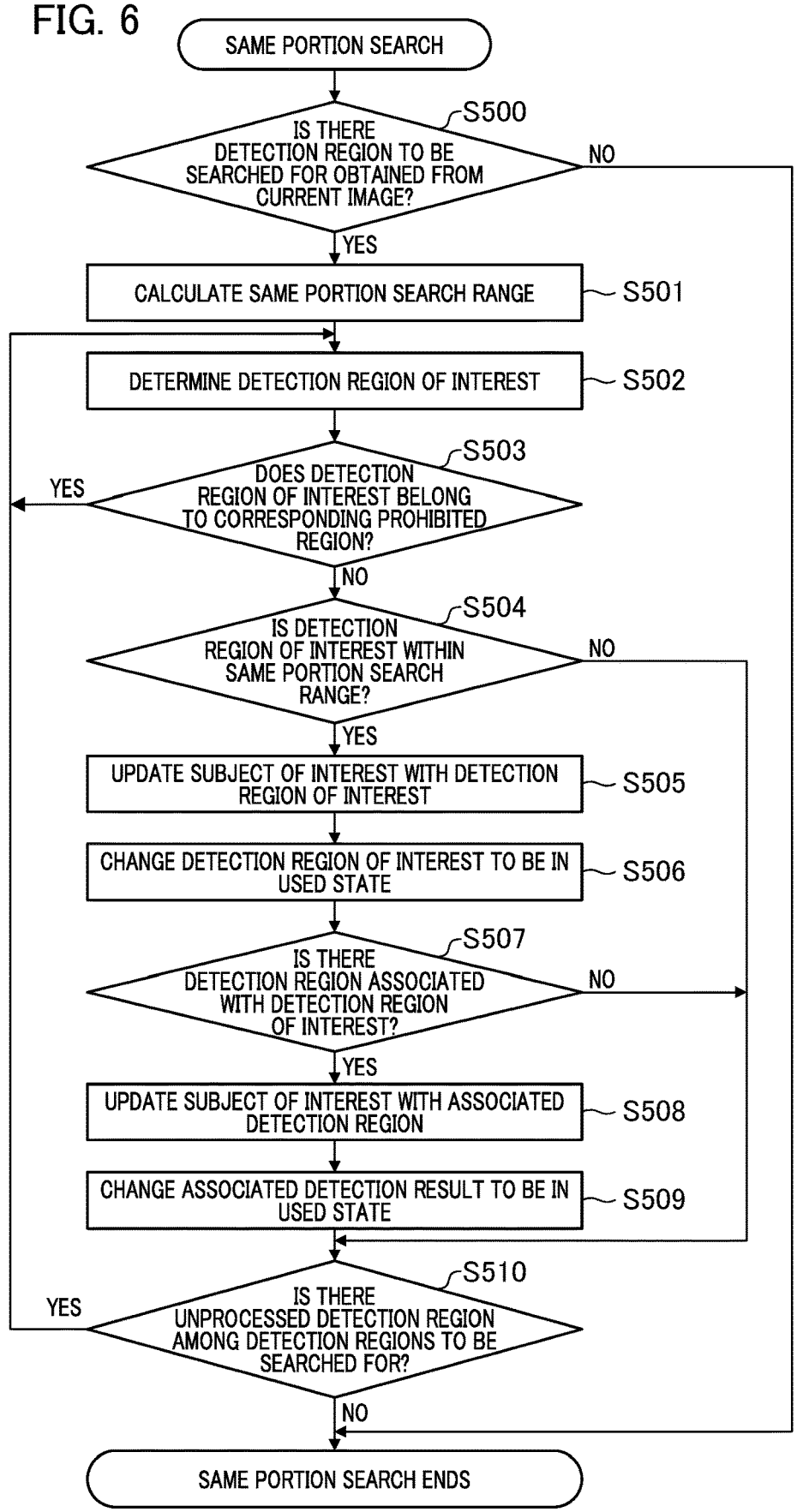
FIG. 6 is a flowchart of a same portion search process according to the present embodiment.

Next, the same portion search process (S403 and S407 of FIG. 4) will be described in detail with reference to FIG. 6. In S500, the CPU 151 determines whether there is a detection region to be searched for obtained from the current image. The detection regions to be searched for are the detection 1 regions in S403 of FIG. 4, and the detection 2 regions in S407. If it is determined that there is a detection region to be searched for, the process proceeds to S501, and if it is determined that there is no detection region to be searched for, the same portion search process ends.

In S501, the CPU 151 calculates a same portion search range. The same portion search range is obtained as a range having the same center of gravity as that of a reference detection region of the subject of interest in the previously acquired image with a predetermined magnification (denoted by $n_1$) of the range of the reference detection region. A value of $n_1$ is set according to the type of a subject to be detected. For example, $n_{1a}$ is set if the type of a subject is a person, and nib ($>n_{1a}$) is set if the type of a subject is an animal. In addition, the reference detection region is a detection 1 region classified as a region of the subject of interest in the previously acquired image in S403 of FIG. 4, and a detection 2 region classified as a region of the subject of interest in the previously acquired image in S407.

In S502, the CPU 151 determines a detection region of interest from candidate detection regions in an unused state obtained from the current image. The candidate detection regions are the detection 1 regions in S403, and the detection 2 regions in S407 of FIG. 4.

In S503, the CPU 151 makes a conditional determination of whether the detection region of interest belongs to a corresponding prohibited region. The corresponding prohibited region is a detection 1 prohibited region in S403 and a detection 2 prohibited region in S407 of FIG. 4. Whether the detection region of interest belongs to the corresponding prohibited region can be determined based on whether the center of gravity of the detection region of interest is present within the corresponding prohibited region. If this condition is satisfied, the process returns to S502, and if the condition is not satisfied, the process proceeds to S504.

In S504, the CPU 151 makes a conditional determination of whether the detection region of interest is included in the same portion search range. If this condition is satisfied, the process returns to S505, and if the condition is not satisfied, the process proceeds to S510.

In S505, the CPU 151 updates the classification results of the subject of interest with the detection region of interest, and the detection region of interest is changed to be in a used state in S506. In S507, the CPU 151 determines whether there is a detection result associated with the detection region of interest in S207 of FIG. 2. If it is determined that there is a corresponding detection result, the process proceeds to S508, and if it is determined that there is no corresponding detection result, the process proceeds to S510.

In S508, the CPU 151 updates the classification results of the subject of interest with the associated detection region, and updates the associated detection results to be in a used state in S509. In S510, the CPU 151 determines whether there is an unprocessed region that has not been selected as a detection region of interest among the detection regions to be searched for. If it is determined that there is a corresponding region, the process returns to S502 to repeat the series of processes, and if it is determined that there is no corresponding region, the same portion search process ends.

Figure 7A:
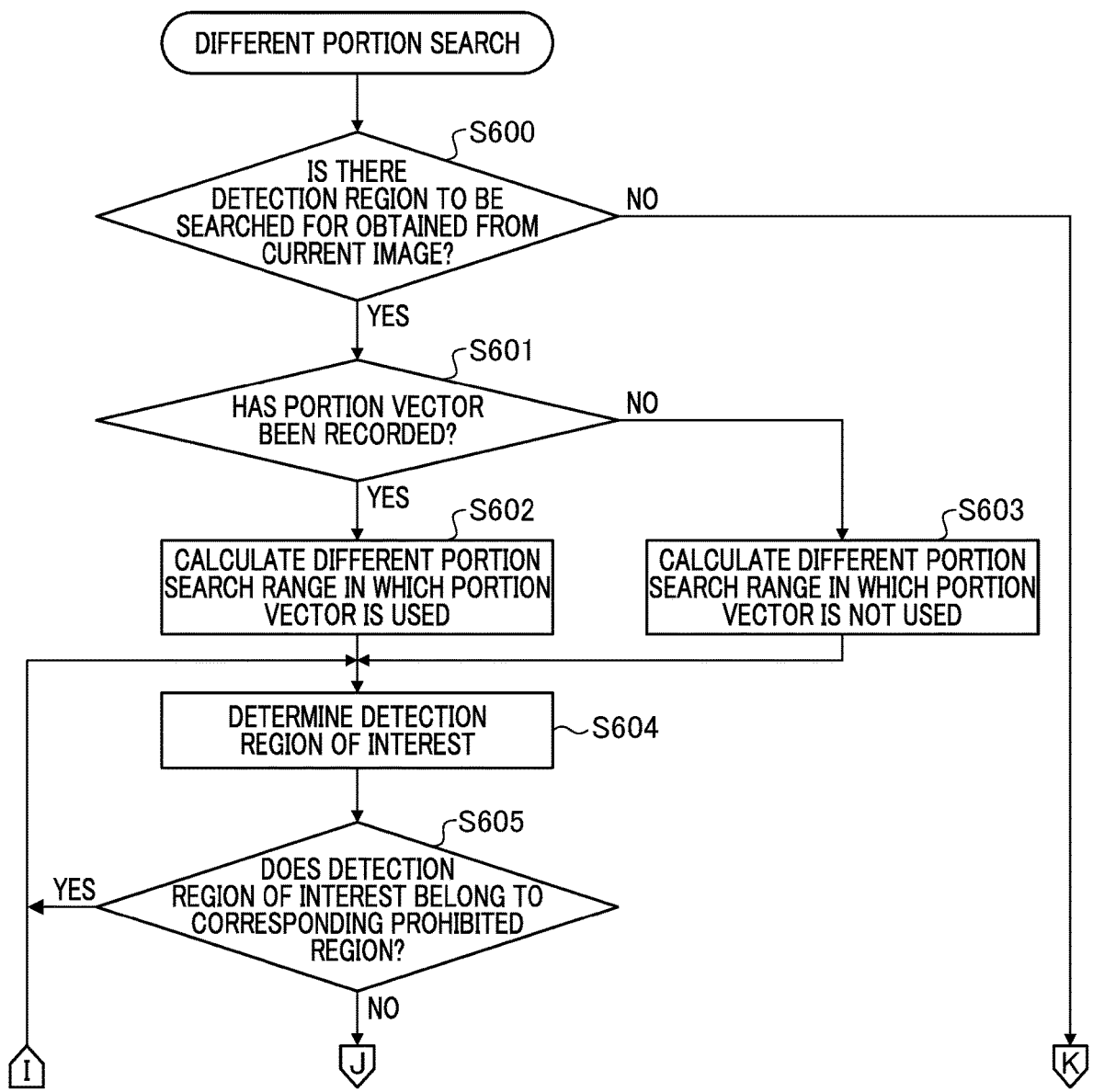
FIGS. 7A and 7B are flowcharts of a different portion search process according to the present embodiment.
Figure 7B:
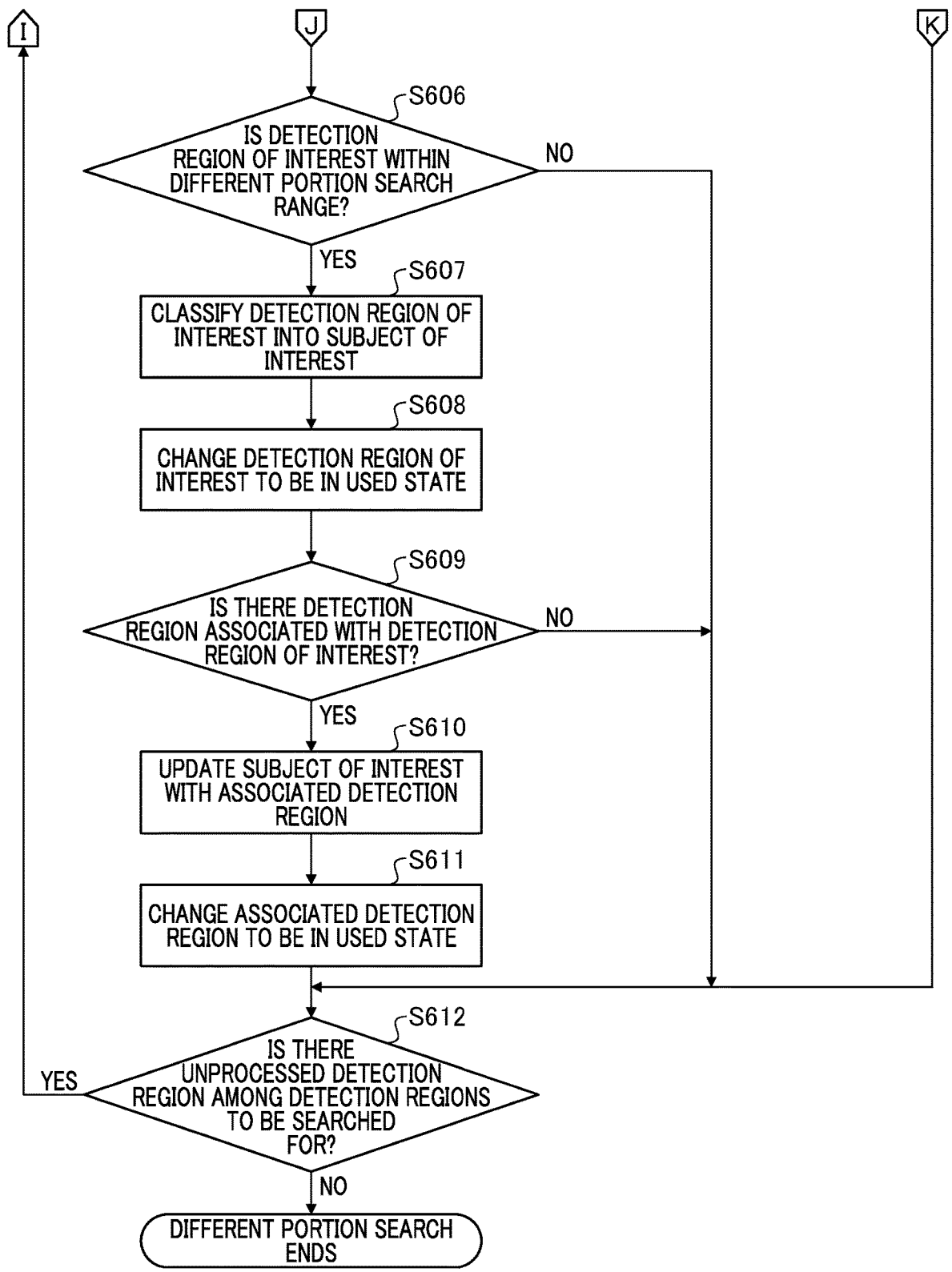

Next, the different portion search process (S405 and S409 of FIG. 4) will be described in detail with reference to FIGS. 7A and 7B. In S600, the CPU 151 determines whether there is a detection region to be searched for obtained from the current image. The detection regions to be searched for are the detection 2 regions in S405, and the detection 1 regions in S409 of FIG. 4. If it is determined that there is a detection region to be searched for, the process proceeds to S601, and if it is determined that there is no detection region to be searched for, the different portion search process ends.

In S601, the CPU 151 determines whether there is a portion vector of the subject of interest recorded in the RAM 154. If it is determined that there is a recorded portion vector, the process proceeds to S602, and if it is determined that there is no recorded portion vector, the process proceeds to S603.

In S602, the CPU 151 calculates a different portion search range in which the portion vector is used. The center of gravity of the different portion search range in this step is obtained by adding or subtracting the portion vector to or from the reference detection region of the subject of interest in the previously acquired image. In addition, the different portion search range is obtained as a range obtained by multiplying the range of the reference detection region of the subject of interest in the previously acquired image by a predetermined magnification (denoted by $n_2$). A value of $n_2$ is set according to the type of a subject to be detected. For example, $n_{2a}$ is set if the type of a subject is a person, and $n_{2b}$ ($>n_{2a}$) is set if the type of a subject is an animal. The reference detection region is a detection 1 region included in the subject classification results of the subject of interest in S405 and a detection 2 region included in the subject classification results of the subject of interest in S407 of FIG. 4.

In S603, the CPU 151 calculates a different portion search range in which no portion vector is used. The different portion search range in this step is obtained as a range having the same center of gravity as that of the reference detection region of the subject of interest in the previously acquired image and obtained by multiplying the range of the reference detection region by a predetermined magnification (denoted by $n_3$). A value of $n_3$ is set according to the type of a subject to be detected and satisfies the relationship "$n_3 > n_2$". For example, $n_{3a}$ is set if the type of a subject is a person, and nab ($>n_{3a}$) is set if the type of a subject is an animal. Description of the reference detection region is the same as that in S602.

In S604, the CPU 151 determines a detection region of interest from candidate detection regions in an unused state obtained from the current image. The candidate detection regions are the detection 2 regions in S405, and the detection 1 regions in S409 of FIG. 4.

In S605, the CPU 151 makes a conditional determination of whether the detection region of interest belongs to a corresponding prohibited region. The corresponding prohibited region is a detection 2 prohibited region in S405 and a detection 1 prohibited region in S409 of FIG. 4. Whether the detection region of interest belongs to the prohibited region can be determined based on whether the center of gravity of the detection region of interest is present within the corresponding prohibited region. If the condition of S605 is satisfied, the process returns to S604, and if the condition of S605 is not satisfied, the process proceeds to S606. Because the processes from S606 to S612 are similar to those from S506 to S510 of FIG. 6, description thereof will be omitted.

Figure 8A:
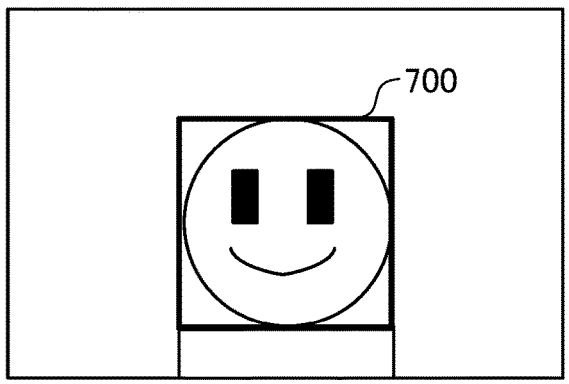
FIGS. 8A and 8B are schematic diagrams of a same portion search example according to the present embodiment.
Figure 8B:
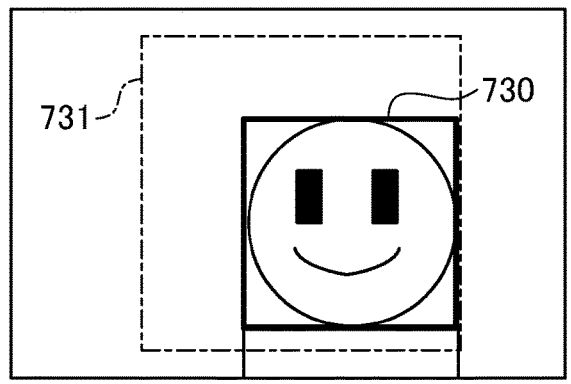

The search process according to the present example will be described in detail with reference to FIGS. 8A to 10B. In FIGS. 8A to 10B, A of each diagram illustrates a previously acquired image, and B of each diagram illustrates a current image. The previously acquired image of FIG. 8A shows an acquired detection 1 region 700 of a subject. In this case, a same portion search range 731 is calculated for the current image of FIG. 8B in S501 of FIG. 6. A subject classification result of the subject of interest is updated using the detection 1 region 730 satisfying a condition within the same portion search range 731.

Figure 9A:
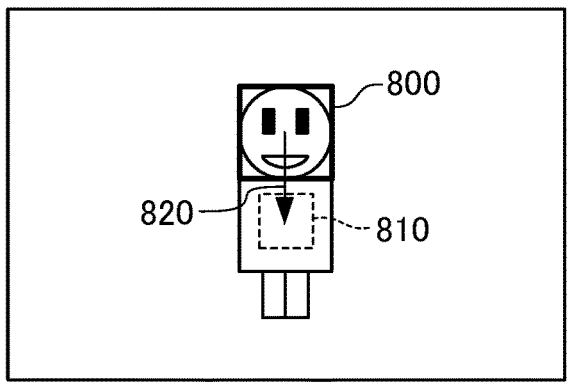
FIGS. 9A and 9B are schematic diagrams of a different portion search example using a portion vector according to the present embodiment.
Figure 9B:
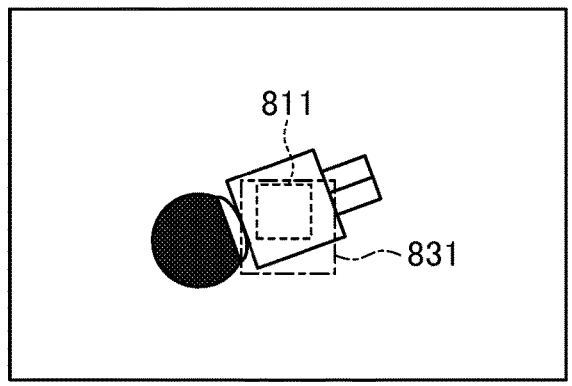

FIGS. 9A and 9B are schematic diagrams of a different portion search example using a portion vector. In the previously acquired image of FIG. 9A, a detection 1 region 800 and a detection 2 region 810 of a subject have been acquired, and a portion vector 820 has been recorded in S411 of FIG. 5. In this case, a different portion search range 831 is calculated for the current image of FIG. 9B in S602 of FIG. 7A. A subject classification result of the subject of interest is updated using a detection 2 region 811 satisfying a condition within the different portion search range 831.

Figure 10A:
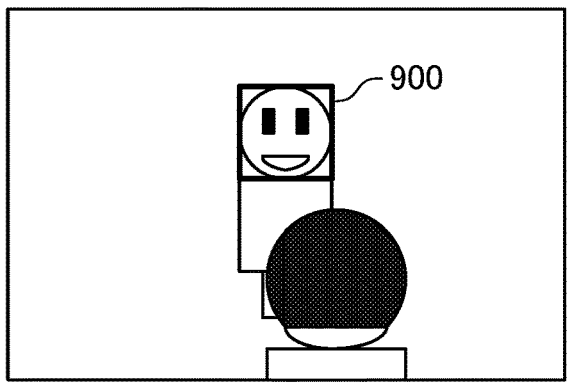
FIGS. 10A and 10B are schematic diagrams of a different portion search example not using a portion vector according to the present embodiment.
Figure 10B:
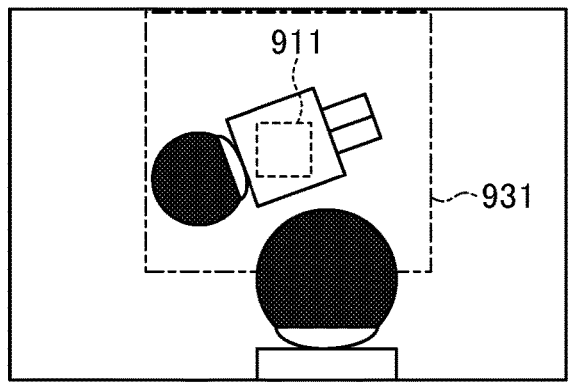

FIGS. 10A and 10B are schematic diagrams of a different portion search example not using a portion vector. The previously acquired image of FIG. 10A shows an acquired detection 1 region 900 of a subject. In this case, a different portion search range 931 is calculated for the current image of FIG. 10B in S603 of FIG. 7A. A subject classification result of the subject of interest is updated using a detection 2 region 911 satisfying a condition within the different portion search range 931.

Figure 11A:
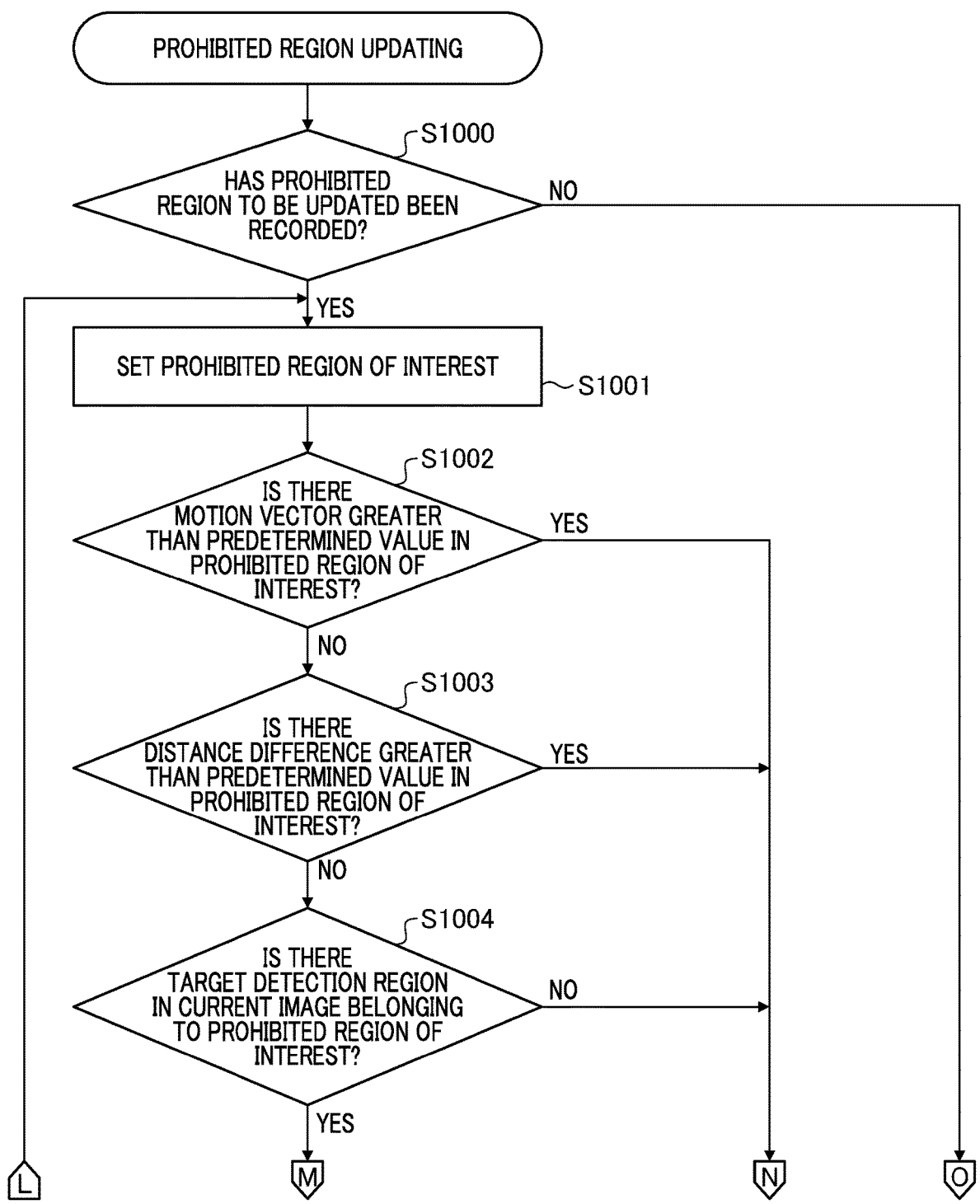
FIGS. 11A and 11B are flowcharts of a prohibited region update process according to the present embodiment.
Figure 11B:
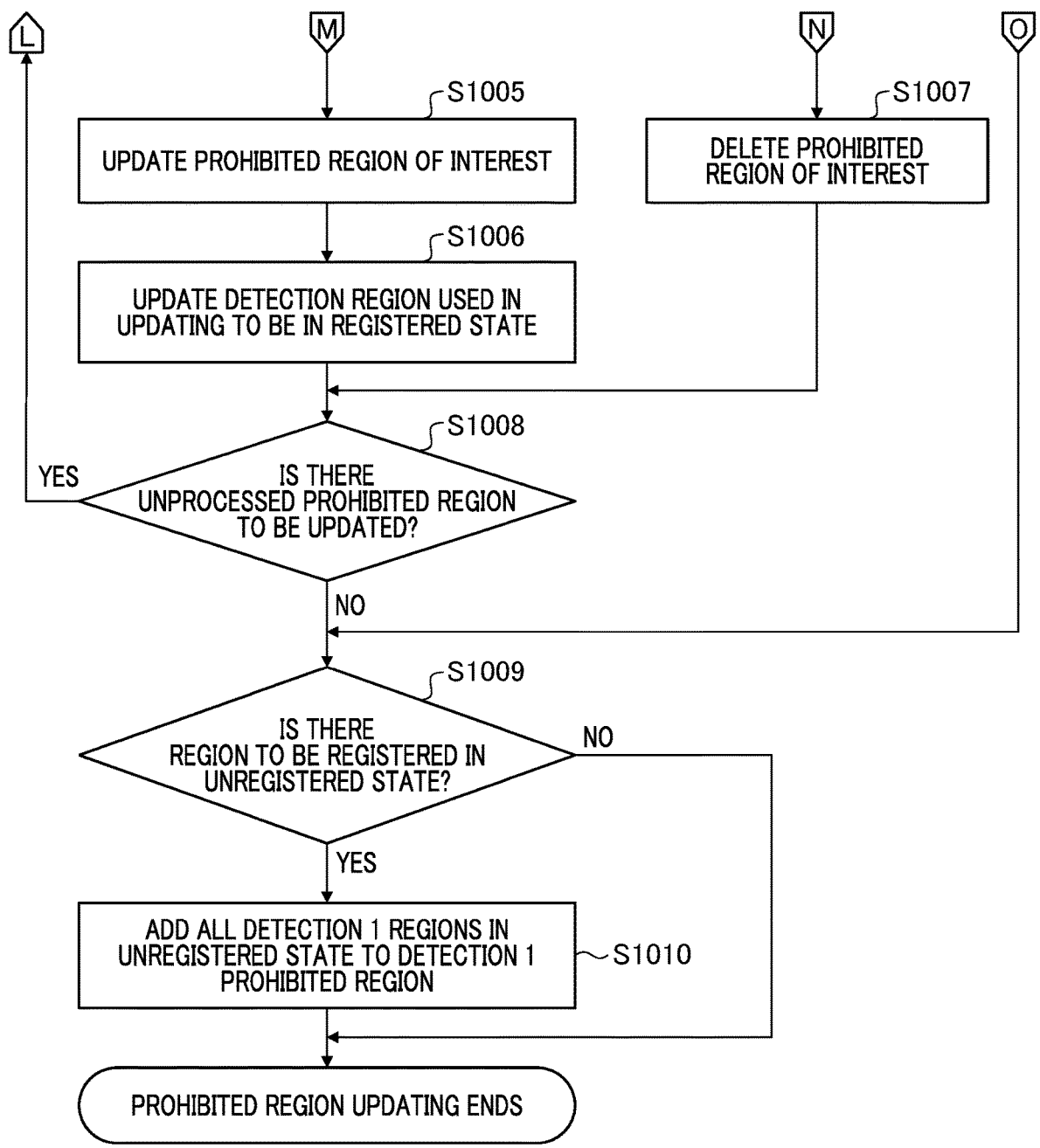

The prohibited region updating process (S414 and S415 of FIG. 5) according to the present example will be described in detail with reference to FIGS. 11A and 11B. In S1000, the CPU 151 determines whether there is a recorded prohibited region in the previously acquired image to be updated. The prohibited region to be updated is a detection 1 prohibited region in S414 and a detection 2 prohibited region in S415 of FIG. 5. If it is determined that a prohibited region to be updated has been recorded, the process proceeds to S1001, and if it is determined that no prohibited region to be updated has been recorded, the process proceeds to S1009.

In S1001, the CPU 151 sets a prohibited region of interest among prohibited regions to be updated. In S1002, the CPU 151 refers to the motion vector map acquired in S205 of FIG. 2 to make a conditional determination of whether there is a motion vector having a value greater than a predetermined value (threshold) in the region corresponding to the prohibited region of interest. If it is determined that there is a motion vector satisfying the condition, the process proceeds to S1007, and if it is determined that there is no motion vector satisfying the condition, the process proceeds to S1003.

In S1003, the CPU 151 compares the defocus map acquired in S206 of FIG. 2 for the previously acquired image and the defocus map acquired in S206 of FIG. 2 for the current image. A process of determining whether there is a distance difference greater than a predetermined value in the region corresponding to the prohibited region of interest is performed. If it is determined that there is a distance difference satisfying the condition, the process proceeds to S1007, and if it is determined that there is no distance difference satisfying the condition, the process proceeds to S1004.

In S1004, the CPU 151 determines whether there is a detection region belonging to the prohibited region of interest among target detection regions obtained from the current image. If it is determined that there is a corresponding detection region, the process proceeds to S1005, and if it is determined that there is no corresponding detection region, the process proceeds to S1007. However, the target detection regions are not used in updating of the subject classification results of the subject of interest in S414 of FIG. 5 and are limited to a detection 1 region that is not in a registered state in S1006. In addition, the target detection regions are not used in updating of the subject classification results of the subject of interest in S415 of FIG. 5 and are limited to a detection 2 region that is not in a registered state in S1006.

In S1005, the CPU 151 updates the prohibited region of interest recorded in the RAM 154. A region to update is set to a region processed to cancel the position/posture change amount obtained in S204 of FIG. 2 with reference to the detection region determined to be present in S1004. The process proceeds to S1006 after S1005.

In S1006, the CPU 151 updates the detection region used in the updating in S1005 to be in a registered state. In S1007, the CPU 151 deletes the prohibited region of interest recorded in the RAM 154. The process proceeds to S1008 after S1006 and S1007.

In S1008, the CPU 151 makes a conditional determination of whether there is a region that is to be updated and is not set as a prohibited region of interest in S1001. If this condition is satisfied, the process returns to S1001 to continue the process, and if the condition is not satisfied, the process proceeds to S1009.

In S1009, the CPU 151 makes a conditional determination of whether there is a target detection region that has not been registered (in an unregistered state) in S1006. If this condition is satisfied, the process proceeds to S1010, and if the condition is not satisfied, the prohibited region updating process ends.

In S1010, the CPU 151 newly adds all detection regions determined to be present (in the unregistered state) in S1009 to the RAM 154 as prohibited regions of the subject of interest. Then, the series of processes ends.

An example of deletion of a prohibited region according to the present example will be described in detail with reference to FIGS. 12A to 12G. FIG. 12A illustrates a detection state of a previously acquired image. Face regions 1100 and 1102 and torso regions 1110 and 1111 have been detected for each of subjects. The subject with the face region 1100 has a portion of the torso hidden by the subject with the torso region 1110 on the front side (the imaging apparatus side).

FIG. 12B illustrates a detection state of a current image. Face regions 1120 and 1121 and torso regions 1130 and 1131 have been detected for each of the subjects. Portions of the face region and the torso region of the subject on the rear side are hidden by the subject with the face region 1120. FIG. 12C illustrates a motion vector map corresponding to the current image. Data of directions and magnitudes of vectors for each of coordinates has been recorded.

FIG. 12D is a distance map corresponding to the previously acquired image. FIG. 12E is a distance map corresponding to the current image. Higher brightness on the distance map indicates a subject being closer to the front side (the imaging apparatus side).

FIG. 12F is a table showing prohibited regions in a case in which the subject C on the foremost side in the previously acquired image is a subject of interest. The face regions 1100 and 1102 are detection 1 prohibited regions, and the torso region 1111 is a detection 2 prohibited region. FIG. 12G is a table showing subject classification results of the current image. For example, the subject having the subject ID C has the face region 1120 that is a detection 1 region and the torso region 1130 that is a detection 2 region.

For the face region 1100 registered as a prohibited region, motion vectors having magnitudes equal to or greater than a predetermined value in the current image are calculated as illustrated in FIG. 12C. Thus, the face region 1100 satisfies the prohibited region deletion condition determined in S1002 of FIG. 11A. In addition, the face region 1100 registered as a prohibited region has distance information changed in the current image as illustrated in FIGS. 12D to 12F. Thus, the face region 1100 satisfies the prohibited region deletion condition determined in S1003 of FIG. 11A.

By deleting the prohibited regions according to such a conditional determination, it is possible to prevent the problem that the subject classification results of the subject of interest are not updated in the search process from occurring in the case in which a detection result of the subject of interest appears in the prohibited regions.

Figure 13:
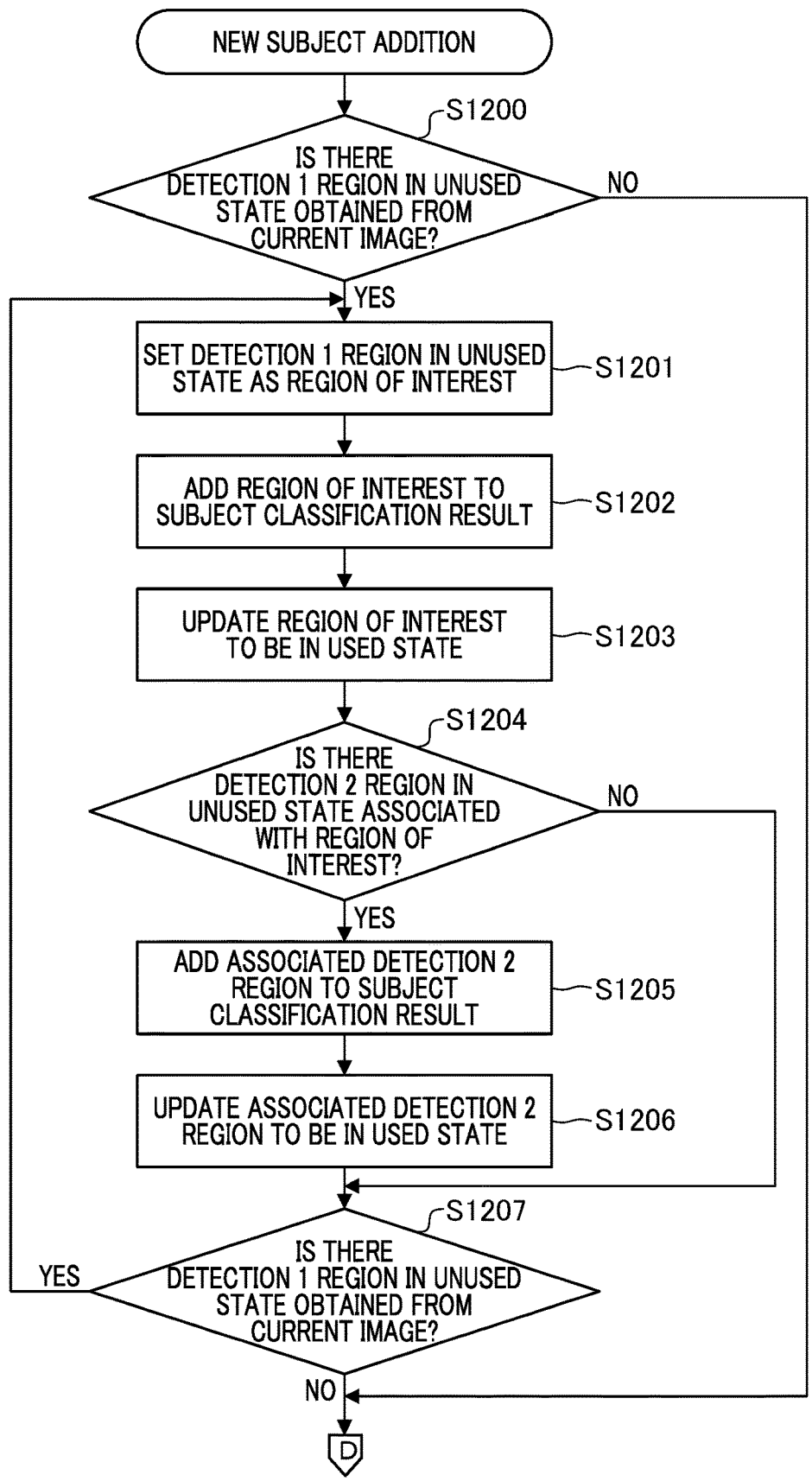
FIG. 13 is a flowchart of a new subject addition process according to the present embodiment.
Figure 14:
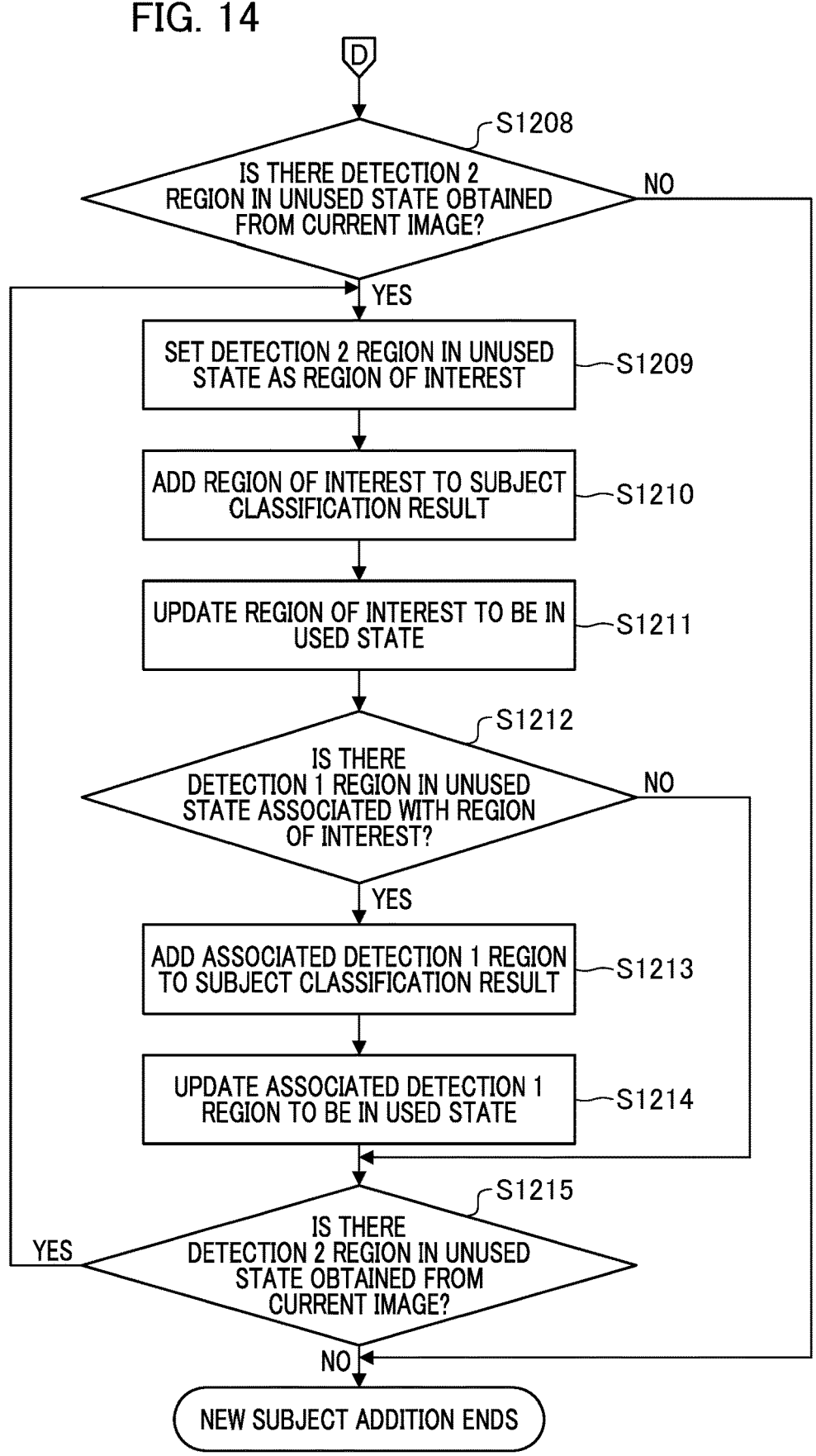
FIG. 14 is a flowchart of a process subsequent to FIG. 13.

The new subject addition process (S210 of FIG. 2) according to the present example will be described in detail with reference to FIGS. 13 and 14. In S1200, the CPU 151 determines whether there is a region in an unused state among the detection 1 regions obtained from the current image. If it is determined that there is a detection 1 region in the unused state, the process proceeds to S1201, and if it is determined that there is no detection 1 region in the unused state, the process proceeds to S1208 of FIG. 14.

In S1201, the CPU 151 sets the detection 1 region in the unused state as a region of interest. In S1202, the CPU 151 gives the region of interest a new subject ID to add the region in the subject classification results and record the region in the RAM 154. In S1203, the CPU 151 sets the region of interest to be in a used state for updating and records the region in the RAM 154.

In S1204, the CPU 151 makes a conditional determination of whether there is a detection 2 region associated with the region of interest in S207 of FIG. 2 and is in an unused state. If this condition is satisfied, the process proceeds to S1205, and if the condition is not satisfied, the process proceeds to S1207.

In S1205, the CPU 151 gives the detection 2 region associated with the region of interest the same subject ID as the subject ID given in S1202 to add the detection 2 region to the subject classification results and record the detection 2 region in the RAM 154. In S1206, the CPU 151 sets the detection 2 region associated with the region of interest to be in a used state and records the detection 2 region in the RAM 154.

In S1207, the CPU 151 makes a conditional determination of whether there is a region in an unused state among the detection 1 regions obtained from the current image. If this condition is satisfied, the process returns to S1201 to continue the process, and if the condition is not satisfied, the process proceeds to S1208 of FIG. 14.

In S1208, the CPU 151 makes a conditional determination of whether there is a region in an unused state among the detection 2 regions obtained from the current image. If this condition is satisfied, the process proceeds to S1209, and if the condition is not satisfied, the new subject addition process ends.

In S1209, the CPU 151 sets the detection 2 region in the unused state as a region of interest. In S1210, the CPU 151 gives the region of interest a new subject ID to add the region in the subject classification results and record the region in the RAM 154. In S1211, the CPU 151 sets the region of interest to be in a used state for updating and records the region in the RAM 154.

In S1212, the CPU 151 makes a conditional determination of whether there is a detection 1 region that is associated with the region of interest in S207 of FIG. 2 and is in an unused state. If this condition is satisfied, the process proceeds to S1213, and if the condition is not satisfied, the process proceeds to S1215.

In S1213, the CPU 151 gives the detection 1 region associated with the region of interest the same subject ID as that of the subject given in S1210 to add the detection 1 region to the subject classification results and record the detection 1 region in the RAM 154. In S1214, the CPU 151 sets the detection 1 region associated with the region of interest to be in a used state for updating and records the detection 1 region in the RAM 154.

In S1215, the CPU 151 makes a conditional determination of whether there is a region in an unused state among the detection 2 regions obtained from the current image. If this condition is satisfied, the process returns to S1209 to continue the process, and if the condition is not satisfied, the new subject addition process ends.

According to the present example, while an error caused by the different portion search is prevented, a search can be continued with a high success rate of subject detection in consecutive frames.

Example 2

Next, Example 2 of the present invention will be described. In the present example, description of matters similar to those of Example 1 will be omitted, and differences will be mainly described. This omission method for description is likewise applied to examples to be described below. It is assumed in the present example that the portion detection unit 161 can detect a face region of a person and a torso region of a person. A detection 1 region is assumed to be a face region, and a detection 2 region is assumed to be a torso region. In addition, it is assumed that a face region in which the photographer is highly interested has a higher importance than a torso region.

Figure 15:
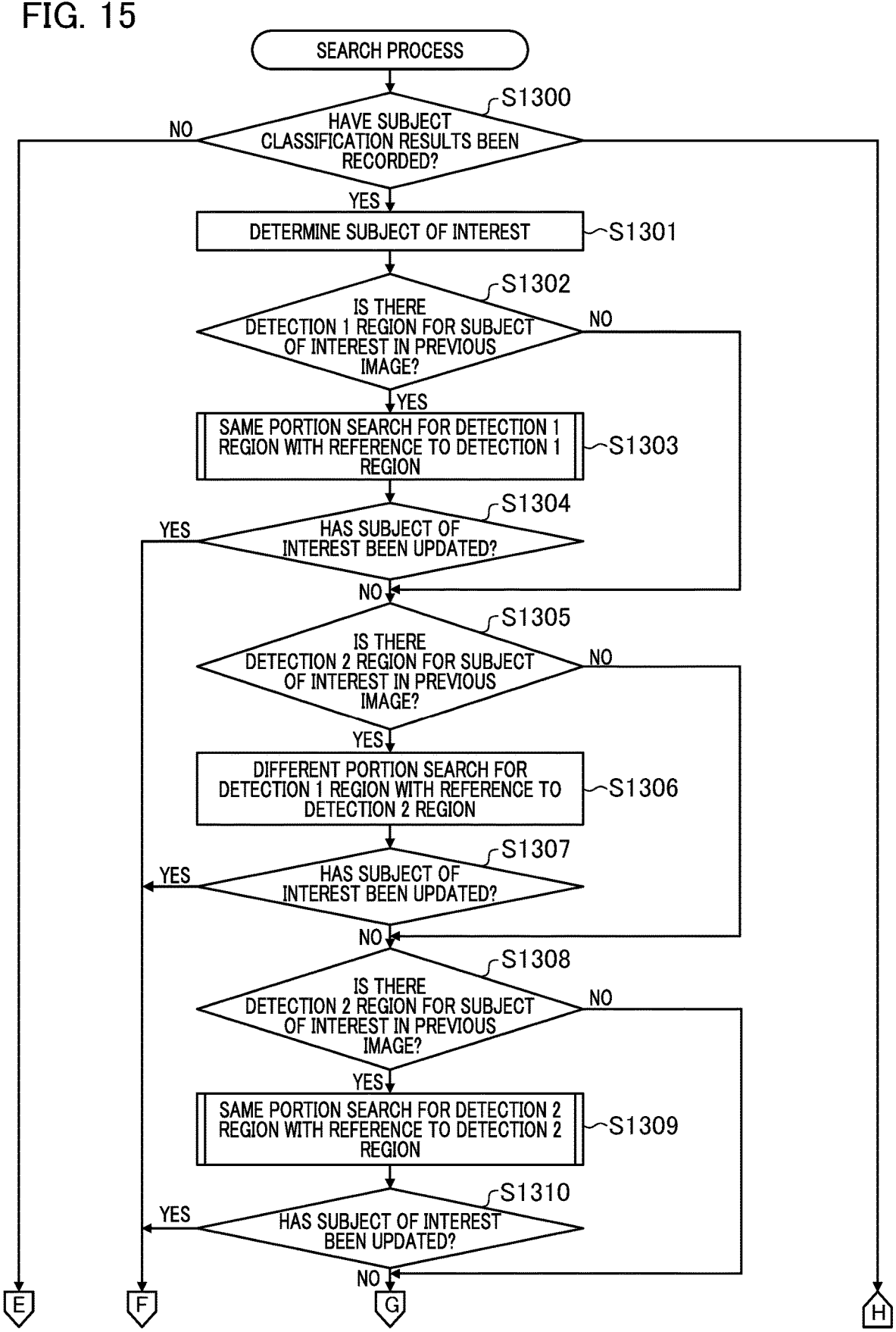
FIG. 15 is a flowchart of a search process according to Examples 2 and 3.

The search process (S209 of FIG. 2) according to the present example will be described in detail with reference to FIGS. 15 and 16. In 51300 of FIG. 15, the CPU 151 determines whether the subject classification results have been recorded in the RAM 154 in the search process for the previously acquired image. If it is determined that subject classification results have been recorded, the process proceeds to S1301, and if it is determined that no subject classification results have been recorded, the search process ends.

In S1301, the CPU 151 determines a subject of interest from the subject classification results recorded in the RAM 154. If there are multiple candidates for the subject of interest, a process of prioritizing a subject with a high subject priority calculated in S211 of FIG. 2 is performed.

In S1302, the CPU 151 determines whether a detection 1 region classified as a region of the subject of interest in the previously acquired image has been recorded in the RAM 154. If it is determined that a detection 1 region has been recorded, the process proceeds to S1303, and if it is determined that no detection 1 region has been recorded, the process proceeds to S1305.

In S1303, the CPU 151 searches multiple detection 1 regions obtained from the current image for the same portion with reference to the detection 1 region classified as the region of the subject of interest in the previously acquired image. In S1304, the CPU 151 makes a conditional determination of whether a subject satisfying the condition has been found from detection regions of the subject of interest in the current image and the subject classification results have been updated. If this condition is satisfied, the process proceeds to S1313 of FIG. 16, and if the condition is not satisfied, the process proceeds to S1305.

In S1305, the CPU 151 determines whether a detection 2 region classified as a region of the subject of interest in the previously acquired image has been recorded in the RAM 154. If it is determined that a corresponding detection 2 region has been recorded, the process proceeds to S1306, and if it is determined that no corresponding detection 2 region has been recorded, the process proceeds to S1308.

In S1306, the CPU 151 searches multiple detection 1 regions obtained from the current image for the different portion with reference to the detection 2 region classified as the region of the subject of interest in the previously acquired image. In S1307, the CPU 151 makes a conditional determination of whether a subject satisfying the condition has been found from detection regions of the subject of interest in the current image and the subject classification results have been updated. If this condition is satisfied, the process proceeds to S1313 of FIG. 16, and if the condition is not satisfied, the process proceeds to S1308.

In S1308, the CPU 151 makes a conditional determination of whether a detection 2 region classified as a region of the subject of interest in the previously acquired image has been recorded in the RAM 154. If this condition is satisfied, the process proceeds to S1309, and if the condition is not satisfied, the process proceeds to S1311 of FIG. 16.

In S1309, the CPU 151 searches multiple detection 2 regions obtained from the current image for the same portion with reference to the detection 2 region classified as the region of the subject of interest in the previously acquired image. In S1310, the CPU 151 makes a conditional determination of whether a subject satisfying the condition has been found from detection regions of the subject of interest in the current image and the subject classification results have been updated. If this condition is satisfied, the process proceeds to S1313 of FIG. 16, and if the condition is not satisfied, the process proceeds to S1311 of FIG. 16.

Figure 16:
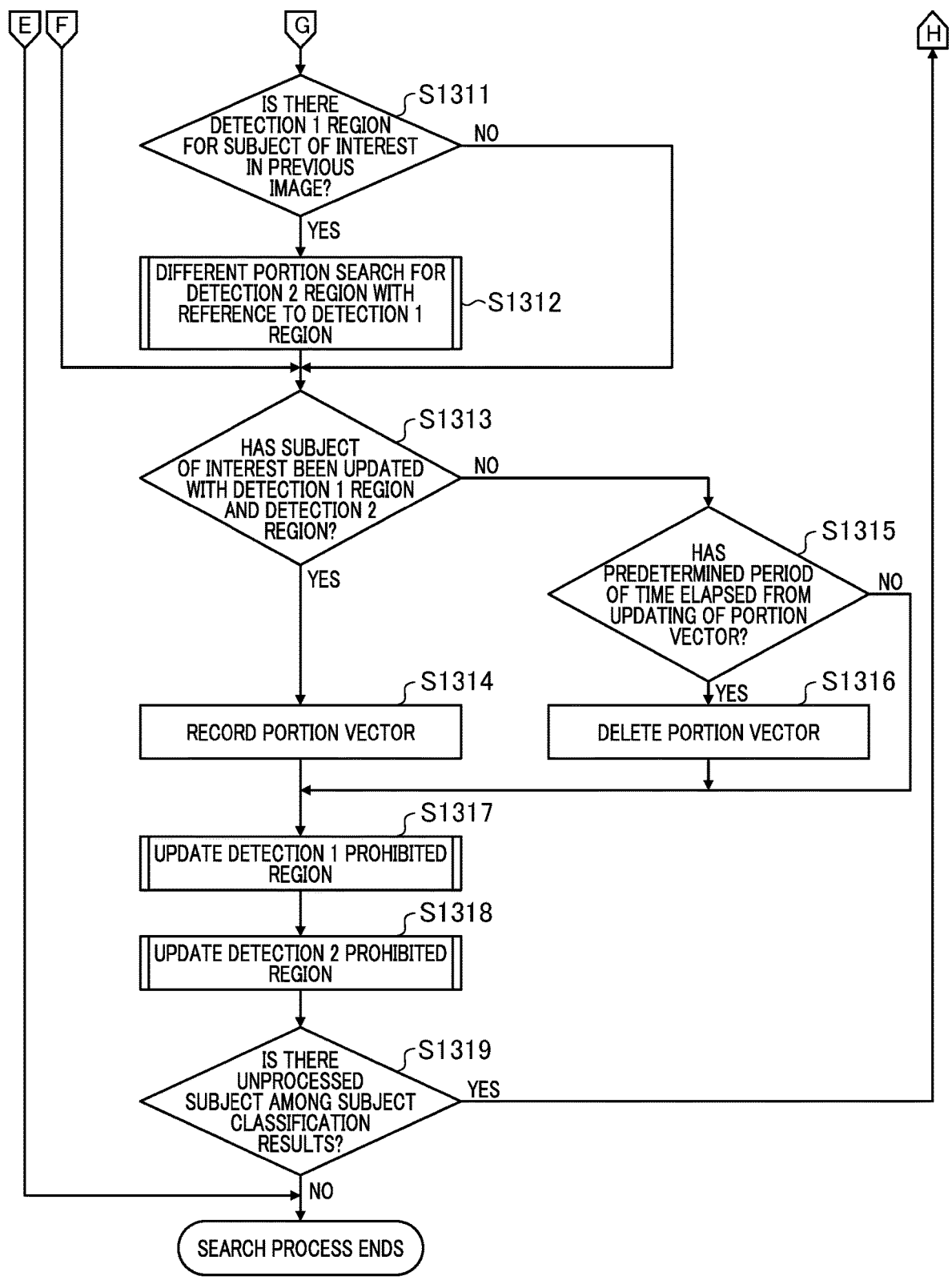
FIG. 16 is a flowchart of a process subsequent to FIG. 15.

In S1311 of FIG. 16, the CPU 151 makes a conditional determination of whether a detection 1 region classified as a region of the subject of interest in the previously acquired image has been recorded in the RAM 154. If this condition is satisfied, the process proceeds to S1312, and if the condition is not satisfied, the process proceeds to S1313. In S1312, the CPU 151 searches multiple detection 2 regions obtained from the current image for the different portion with reference to the detection 1 region classified as the region of the subject of interest in the previously acquired image.

Figure 5:
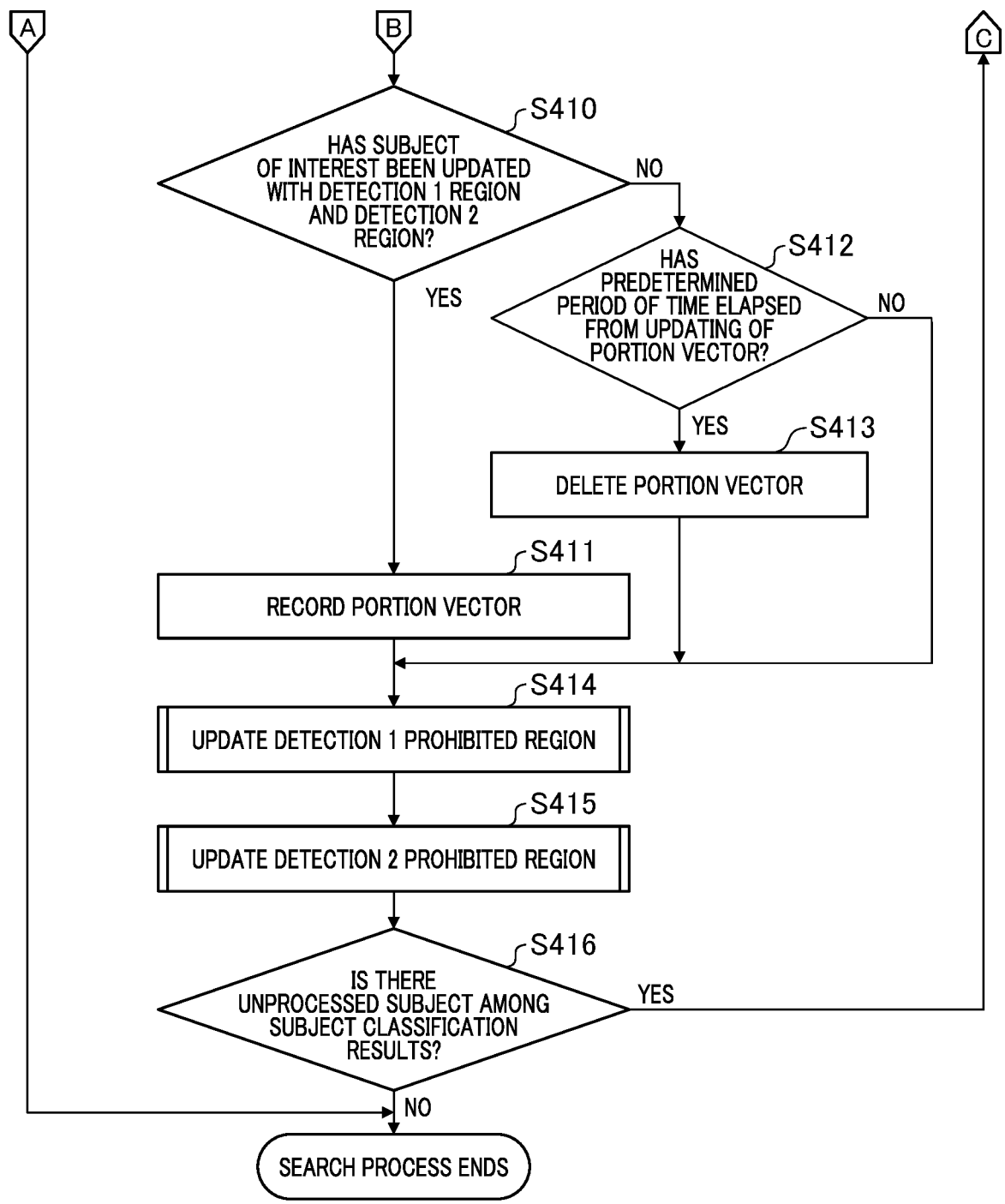
FIG. 5 is a flowchart of a process subsequent to FIG. 4.

Because the processes from S1313 to S1319 are similar to those from S410 to S416 of FIG. 5 described in Example 1, description thereof will be omitted. The same portion search process, the different portion search process, the prohibited region updating process, and the new subject addition process of the present example are similar to those of Example 1.

In the present example, the same portion search process with higher accuracy is preferentially performed over the different portion search process with lower accuracy. If a subject of interest has been updated in the prioritized search process, the search process with higher accuracy can be performed without performing the other search process. In addition, because the process of S1303 is preferentially performed over that of S1309 of FIG. 15 in the same portion search process, it is possible to raise the probability of updating information of the subject of interest with a detection region having a high importance. According to the present example, while an error caused by the different portion search is prevented and a region with a high importance is prioritized, a search can be continued with a high success rate of subject detection in consecutive frames.

Example 3

Next, differences of Example 3 of the present invention from Example 2 will be described. It is assumed in the present example that the portion detection unit 161 can detect a whole body region of a person and an eye region of a person. A detection 1 region is assumed to be a whole body region, and a detection 2 region is assumed to be an eye region. In addition, it is assumed that a whole body size of a person has a higher importance because it is sufficiently greater than a size of an eye of a person. Alternatively, it is assumed that a whole body region of a person has a higher importance because the whole body region includes the eye region of the person. Further, search processes of the present example are similar to those of Example 2 (description of the same portion search process, the different portion search process, the prohibited region updating process, the new subject addition process, and the like will be omitted).

In the present example, the search processes with high accuracy can be performed similarly to those of Example 2. In addition, because the process of S1303 is preferentially performed over the process of S1309 of FIG. 15, an error in search attributable to a local region (a small-sized region) can be prevented. According to the present example, while an error caused by the different portion search and an error caused by a local region are prevented, a search can be continued with a high success rate of subject detection in consecutive frames.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-030678, filed Feb. 26, 2021, which is hereby incorporated by reference wherein in its entirety.

What is claimed is:

1. An image processing device which tracks a subject across multiple images comprising:
   at least one processor and a memory holding a program which makes the processor function as:
   an acquisition unit configured to acquire a captured image,
   a detection unit configured to detect multiple portions of the subject in the image, and
   a search unit configured to use a detection result obtained from a first previously acquired image to search for a detection result obtained from a current second image and classify a detection result satisfying a tracking condition for the subject,
   wherein, in a case in which the search unit is able to perform a different portion search using detection results of corresponding ones of different portions from the first image and the second image and a same portion search using detection results of corresponding ones of the same portion from the first image and the second image, the same portion search is preferentially performed over the different portion search,
   whereby the subject is tracked across multiple images in which portions of the subject are occluded in some of the multiple images.

2. The image processing device according to claim 1, wherein the detection unit performs first detection to detect a first portion of the subject in the image and second detection to detect a second portion of the subject in the image, and
   wherein, in a case in which an importance of a detection result from the first detection is higher than an importance of a detection result of the second detection, the search unit prioritizes a search using the detection result for the first detection.

3. The image processing device according to claim 2, wherein the detection unit detects a face region of the subject in the first detection, detects a torso region of the subject in the second detection or detects a whole body region of the subject in the first detection, and detects an eye region of the subject in the second detection.

4. The image processing device according to claim 2, wherein the search unit prioritizes a search using a detection result of a portion having a larger size over a search using a detection result of a portion having a smaller size.

5. The image processing device according to claim 2, wherein the search unit prioritizes a search using a detection result of the first portion in a case in which the first portion includes the second portion.

6. The image processing device according to claim 2, wherein the processor further functions as:
   a labeling processing unit configured to acquire a label map of each subject for an acquired image; and
   an association processing unit configured to associate a detection region from the first detection with a detection region from the second detection using the label map.

7. The image processing device according to claim 6, wherein, in a case in which there is a detection result satisfying a pre-determined condition and being associated by the association processing unit among multiple detection results obtained from the second image, the search unit performs a process of classifying the multiple detection results for each subject.

8. The image processing device according to claim 1, wherein, in a case in which there is a detection result classified for multiple subjects in the first image, the search unit performs a search process for each of the multiple subjects in the second image.

9. The image processing device according to claim 1, wherein the processor further functions as a calculation unit configured to calculate a priority of a subject for multiple subjects, and
   wherein the search unit performs a search process preferentially on a subject with a high priority.

10. The image processing device according to claim 1, wherein the processor further functions as a registration unit configured to register a detection result that is not classified by the search unit as a detection result of a new subject.

11. The image processing device according to claim 1, wherein the search unit does not use a detection result classified for the first subject among detection results obtained from the second image for a search process of a second subject.

12. The image processing device according to claim 2, wherein the search unit performs the different portion search using a portion vector acquired using the detection results from the first and second detection.

13. The image processing device according to claim 12, wherein the processor further functions as a recording unit configured to record the portion vector, and
    wherein, in a case in which the detection results from the first and second detection obtained from the first image are classified as a detection result of a subject of interest, the search unit calculates a search range of the different portion search in the second image using the portion vector.

14. The image processing device according to claim 13, wherein the processor further functions as a deletion unit configured to delete the portion vector from the recording unit in a case in which the vector portion is not updated in a pre-determined period of time.

15. The image processing device according to claim 1, wherein the processor further functions as a recording unit configured to acquire information indicating a change in a position or a posture of an imaging unit when the image is acquired and to record a prohibited region calculated using a detection result that is not classified by the search unit for a subject of interest in the first image and the acquired information, and
    wherein the search unit does not use a detection result belonging to the prohibited region among detection results obtained from the second image in a search process of the subject of interest.

16. The image processing device according to claim 15, wherein the processor further functions as:
    a motion vector calculation unit configured to calculate a motion vector within an image using the first and the second images and the information; and
    a deletion unit configured to delete the prohibited region from the recording unit in a case in which there is a motion vector corresponding to the prohibited region.

17. The image processing device according to claim 16, wherein the acquisition unit acquires distance information related to the image, and wherein the deletion unit deletes the prohibited region from the recording unit in a case in which a change in the distance information corresponding to the prohibited region is greater than a threshold.

18. The image processing device according to claim 16, wherein the deletion unit deletes the prohibited region from the recording unit in a case in which a detection result belonging to the prohibited region is not obtained in the second image.

19. The image processing device according to claim 1, wherein
the detection unit uses a convolutional neural network (CNN) to detect multiple portions of the subject in the image, and wherein the detection result obtained from the first previously acquired image is obtained by the CNN and the detection result obtained from the current second image is obtained by the CNN.

20. The image processing device according to claim 1, wherein
search results are utilized in automatic focus adjustment control.

21. An imaging apparatus which tracks a subject across multiple images comprising:
at least one processor and memory holding a program which makes the processor function as:
an acquisition unit configured to acquire a captured image,
a detection unit configured to detect multiple portions of the subject in the image, and
a search unit configured to use a detection result obtained from a first previously acquired image to search for a detection result obtained from a current second image and classify a detection result satisfying a tracking condition for the subject,
wherein, in a case in which the search unit is able to perform a different portion search using detection results of corresponding ones of different portions from the first image and the second image and a same portion search using detection results of corresponding ones of the same portion from the first image and the second image, the same portion search is preferentially performed over the different portion search,
whereby the subject is tracked across multiple images in which portions of the subject are occluded in some of the multiple images.

22. A control method performed by an image processing device configured to acquire a captured image and to track a subject across multiple images, the control method comprising:
detecting multiple portions of the subject in the image;
using a detection result obtained from a first previously acquired image to search for a detection result obtained from a current second image; and
classifying a detection result satisfying a tracking condition for the subject,
wherein, in a case in which a different portion search using detection results of corresponding ones of different portions from the first image and the second image and a same portion search using detection results of corresponding ones of the same portion from the first image and the second image are performed in the search, the same portion search is preferentially performed over the different portion search,
whereby the subject is tracked across multiple images in which portions of the subject are occluded in some of the multiple images.

23. A non-transitory recording medium storing a control program of an image processing device configured to acquire a captured image and to track a subject across multiple images, the non-transitory recording medium causing a computer to perform each step of a control method of the image processing device, the method comprising:
detecting multiple portions of the subject in the image;
using a detection result obtained from a first previously acquired image to search for a detection result obtained from a current second image; and
classifying a detection result satisfying a tracking condition for the subject,
wherein, in a case in which a different portion search using detection results of corresponding ones of different portions from the first image and the second image and a same portion search using detection results of corresponding ones of the same portion from the first image and the second image are performed in the search, the same portion search is preferentially performed over the different portion search,
whereby the subject is tracked across multiple images in which portions of the subject are occluded in some of the multiple images.

24. An image processing device which tracks a subject across multiple images comprising:
at least one processor and a memory holding a program which makes the processor function as:
an acquisition unit configured to acquire a captured image,
a detection unit configured to detect multiple portions of the subject in the image, and
a search unit configured to perform a different portion search which searches corresponding ones of different portions of the subject between a first image and a second image and perform a same portion search which searches corresponding ones of same portion of the subject between the first image and the second image,
wherein the search unit obtain detection results by giving priority to the same portion search over the different portion search,
whereby the subject is tracked across multiple images in which portions of the subject are occluded in some of the multiple images.

25. The image processing device according to claim 24, wherein the detection unit detects a face region of the subject in a first detection, detects a torso region of the subject in a second detection or detects a whole body region of the subject in the first detection, and detects an eye region of the subject in the second detection, and
wherein, in a case in which an importance of a detection result from the first detection is higher than an importance of a detection result of the second detection, the search unit prioritizes a search using the detection result for the first detection.

26. The image processing device according to claim 24, wherein, in a case in which there is a detection result classified for multiple subjects in the first image, the search unit performs a search process for each of the multiple subjects in the second image.

27. The image processing device according to claim 24, wherein the processor further functions as a calculation unit configured to calculate a priority of a subject for multiple subjects, and
wherein the search unit performs a search process preferentially on a subject with a high priority.

28. The image processing device according to claim 24, wherein the processor further functions as a registration unit configured to register a detection result that is not classified by the search unit as a detection result of a new subject.

29. The image processing device according to claim 24, wherein the search unit does not use a detection result classified for the first subject among detection results obtained from the second image for a search process of a second subject.

30. The image processing device according to claim 24, wherein the search unit performs the different portion search using a portion vector acquired using the detection results from a first detection to detect a first portion of the subject in the image and a second detection second detection to detect a second portion of the subject in the image.

31. A control method performed by an image processing device configured to acquire a captured image and to track a subject across multiple images, the control method comprising:

a detecting multiple portions of the subject in the image;

performing a different portion search which searches corresponding ones of different portions of the subject between a first image and a second image; and performing a same portion search which searches corresponding ones of same portion of the subject between the first image and the second image, wherein obtain the detection results by giving priority to the same portion search over the different portion search, whereby the subject is tracked across multiple images in which portions of the subject are occluded in some of the multiple images.

* * * * *